United States Patent
Yoshihashi

(10) Patent No.: US 12,359,688 B2
(45) Date of Patent: Jul. 15, 2025

(54) CLIP ATTACHMENT STRUCTURE

(71) Applicant: DAIWA KASEI INDUSTRY CO., LTD., Okazaki (JP)

(72) Inventor: Kiyohiro Yoshihashi, Okazaki (JP)

(73) Assignee: DAIWA KASEI INDUSTRY CO., LTD., Okazaki (JP)

( * ) Notice: Subject to any disclaimer, the term of this patent is extended or adjusted under 35 U.S.C. 154(b) by 256 days.

(21) Appl. No.: 17/577,116

(22) Filed: Jan. 17, 2022

(65) Prior Publication Data

US 2022/0228618 A1    Jul. 21, 2022

(30) Foreign Application Priority Data

Jan. 21, 2021   (JP) .................................. 2021-007707

(51) Int. Cl.
*F16B 21/08*       (2006.01)
*F16B 5/06*        (2006.01)

(52) U.S. Cl.
CPC ............ *F16B 21/084* (2013.01); *F16B 5/065* (2013.01); *F16B 5/0657* (2013.01)

(58) Field of Classification Search
CPC ...... F16B 21/084; F16B 5/065; F16B 5/0657; F16B 21/086; F16B 1/0071; F16B 15/06
USPC ................... 411/451.1, 451.3, 456, 508–510
See application file for complete search history.

(56) References Cited

U.S. PATENT DOCUMENTS

| | | | | | |
|---|---|---|---|---|---|
| 424,081 | A | * | 3/1890 | Smith | ..................... F16B 15/06 411/451.3 |
| 945,452 | A | * | 1/1910 | Hadler | ..................... F16B 15/06 411/456 |
| 1,274,923 | A | * | 8/1918 | Mayner | ..................... F16B 15/06 411/394 |

(Continued)

FOREIGN PATENT DOCUMENTS

| GB | 2077845 A | * | 12/1981 | ............ F16B 19/004 |
|---|---|---|---|---|
| JP | H0635624 U | * | 5/1993 | .............. F16B 19/00 |

(Continued)

OTHER PUBLICATIONS

Japanese language office action dated May 31, 2024, issued in application No. JP 2021-007707.

(Continued)

*Primary Examiner* — Christine M Mills
*Assistant Examiner* — Dil K. Magar
(74) *Attorney, Agent, or Firm* — McClure, Qualey & Rodack, LLP

(57) ABSTRACT

A clip is attached such that a leg portion protruding downward from a head portion is inserted into a cylindrical insertion hole of an attachment-target member. The clip has a plurality of engagement protrusions protruding from the leg portion and arranged in an insertion direction. The engagement protrusions have engagement corners sharpened to have a corner radius less than 0.2 mm. At the time of insertion into the insertion hole, the engagement corners slide on an inner circumferential wall surface while the (Continued)

engagement protrusions are elastically deformed. After the insertion, the engagement protrusions are elastically restored to dig into the inner circumferential wall surface, thereby preventing the clip from coming off from the insertion hole.

8 Claims, 21 Drawing Sheets

(56) References Cited

U.S. PATENT DOCUMENTS

| | | | | |
|---|---|---|---|---|
| 3,737,128 | A * | 6/1973 | Schuplin | F16B 19/004 411/510 |
| 3,810,279 | A * | 5/1974 | Swick | F16B 21/084 411/509 |
| 4,381,622 | A * | 5/1983 | Spidell | A01G 9/28 47/33 |
| 4,396,329 | A * | 8/1983 | Wollar | F16B 21/084 411/452 |
| 4,402,641 | A * | 9/1983 | Arff | F16B 19/004 411/908 |
| 4,422,276 | A * | 12/1983 | Paravano | B60R 13/0206 411/510 |
| 4,427,328 | A * | 1/1984 | Kojima | F16B 21/084 24/625 |
| 4,568,215 | A * | 2/1986 | Nelson | B29C 66/474 24/297 |
| 4,571,136 | A * | 2/1986 | Peek | F16B 37/0842 411/510 |
| 4,728,238 | A * | 3/1988 | Chisholm | F16B 19/004 411/510 |
| 4,759,670 | A * | 7/1988 | Linder | F16B 19/1081 411/908 |
| 4,776,739 | A * | 10/1988 | Hamman | F16B 21/084 24/297 |
| 5,288,189 | A * | 2/1994 | Hepworth | F16B 13/02 411/510 |
| 5,316,245 | A * | 5/1994 | Ruckwardt | F16B 21/084 248/68.1 |
| 5,373,611 | A * | 12/1994 | Murata | F16B 21/084 24/453 |
| 5,468,108 | A * | 11/1995 | Sullivan | F16B 21/084 411/908 |
| 5,695,307 | A * | 12/1997 | Takahashi | F16B 5/0642 411/482 |
| 8,393,058 | B2 * | 3/2013 | Okada | B60R 13/0206 24/297 |
| 9,033,635 | B2 * | 5/2015 | Wesolowska | E04F 19/067 52/456 |
| 10,634,180 | B2 * | 4/2020 | Sawada | F16B 21/084 |
| 2007/0020064 | A1 * | 1/2007 | Mostazo-Oviedo | F16B 13/02 411/510 |
| 2007/0134073 | A1 * | 6/2007 | Shereyk | F16B 21/084 411/510 |
| 2009/0265900 | A1 * | 10/2009 | Okada | F16B 21/086 24/458 |
| 2009/0307883 | A1 * | 12/2009 | Schliessner | F16B 21/084 24/584.1 |
| 2010/0180410 | A1 * | 7/2010 | Kalyanadurga | F16B 21/084 24/595.1 |
| 2012/0110793 | A1 * | 5/2012 | Watanabe | B60R 13/0206 24/289 |
| 2015/0219137 | A1 * | 8/2015 | Koelling | F16B 19/002 411/510 |
| 2017/0059060 | A1 * | 3/2017 | Gallion | H02G 3/32 |
| 2018/0119719 | A1 * | 5/2018 | Sawada | F16B 21/084 |

FOREIGN PATENT DOCUMENTS

| | | | | |
|---|---|---|---|---|
| JP | 2009030804 | A * | 2/2009 | F16B 5/06 |
| JP | 2009270615 | A * | 11/2009 | F16B 19/00 |
| JP | 2010276109 | A | 12/2010 | |
| JP | 5128546 | B2 * | 1/2013 | B60R 13/0206 |
| JP | 2015086989 | A | 5/2015 | |
| WO | WO-8807139 | A1 * | 3/1988 | F16B 13/02 |

OTHER PUBLICATIONS

English language translation of office action dated May 31, 2024.

\* cited by examiner

CLIP ATTACHMENT STRUCTURE

RELATED APPLICATIONS

This application claims the priority of Japanese Patent Application No. 2021-007707 filed on Jan. 21, 2021. The disclosure of the prior application is hereby incorporated herein in the entirety by reference.

BACKGROUND OF THE INVENTION

Field of the Invention

This invention relates to a clip attachment structure.

Description of Related Art

Japanese Laid-Open Patent Publication No. 2009-270615 describes such a clip attachment structure that a shaft portion of a clip body is inserted into a pedestal of a target member and the clip body is rotated around the axis by operation pieces, whereby fastening blades dig into a peripheral surface of the pedestal and thus the clip body and the target member are joined to each other.

However, in the case of the above clip, it is necessary to perform two operations of insertion and then rotation, and therefore workability is low. In addition, the axial hole of the pedestal into which the shaft portion of the clip body is inserted has a special shape, i.e., an elongated-hole shape, and therefore versatility is low. Accordingly, a structure having a simpler shape is desired.

An object of this invention is to provide a clip attachment structure that facilitates attachment work to an attachment-target member and has a simpler shape in an attachment portion of the attachment-target member.

SUMMARY OF THE INVENTION

A clip attachment structure for solving the aforementioned problem is a clip attachment structure in which a clip having a head portion and a leg portion protruding downward therefrom is attached such that the leg portion is inserted into a cylindrical insertion hole of an attachment-target member. The clip has a plurality of plate-shaped engagement protrusions arranged in an insertion direction into the insertion hole, the plate-shaped engagement protrusions extending outward from an outer circumferential surface of the leg portion in a non-elastically-deformed state. The engagement protrusions have sharpened corners at outermost edge portions corresponding to most distant positions from an axis of the leg portion on upper surfaces or lower surfaces thereof, the sharpened corners being sharpened to have a corner radius less than 0.2 mm. The sharpened corners include engagement corners configured to, at a time of insertion into the insertion hole, slide on an inner circumferential wall surface of the insertion hole while the engagement protrusions are elastically deformed, and after the insertion, form an engaged state of digging into the inner circumferential wall surface by elastic restoration of the engagement protrusions, thus preventing the clip from coming off from the insertion hole.

With the aforementioned configuration according to this invention, the clip is inserted into a simple cylindrical insertion hole. In each engagement protrusion pressed to the inner circumferential wall surface of the insertion hole, a corner at the outermost edge thereof is formed to be a sharpened corner that is substantially not rounded, instead of being rounded to be smoothly curved as in the conventional one. Thus, the sharpened corner (engagement corner) of the engagement protrusion more readily and more firmly digs into the inner circumferential wall surface of the insertion hole, and therefore coming-off from the insertion hole can be assuredly prevented simply by inserting the leg portion. Such a labor as to rotate the clip after insertion into an elongated hole in order to cause digging as in the conventional case is not needed.

Each engagement protrusion may be formed so as to satisfy $L1 \times 1/3 \leq L2$ at least for an 80% region on the leg portion side in a length direction thereof, where L1 is a length of the engagement protrusion and L2 is a plate thickness thereof. With this configuration, each engagement protrusion is formed to have a certain thickness or more over a range up to a position close to the distal end. Thus, stiffness of each engagement protrusion is enhanced, so that the engagement corners can more firmly dig into the inner circumferential wall surface of the insertion hole. In addition, even if a force in a come-off direction is applied after the digging, each engagement protrusion is hardly bent owing to the stiffness, and therefore can sufficiently withstand the force, thereby preventing the clip from coming off. The corresponding part in the conventional clip is designed on the premise that this part is bent so as to reduce insertion resistance at the time of insertion, and therefore cannot have such a thickness as prescribed in this invention.

Here, regarding at least one of the engagement corners of each engagement protrusion, in a cross-section including the engagement corner and the axis of the leg portion, the length of a straight line PQ from a vertex P of the engagement corner to a connection point Q between the engagement protrusion and the leg portion is defined as the length L1 of the engagement protrusion. Further, in a direction perpendicular to, of the upper and lower surfaces of the engagement protrusion, the surface having the engagement corners, a length from the surface to the other surface is defined as the plate thickness L2 of the engagement protrusion. The length direction of the engagement protrusion is defined as the extending direction of the straight line PQ. In a case where each engagement protrusion has a plurality of engagement corners, L2 and L1 only have to satisfy the above relationship in the above cross-section including any of the engagement corners.

The engagement corners may be arranged so as to be distributed on a predetermined helix coaxial with the axis of the leg portion, thus serving as thread crests, so that the clip in the engaged state is allowed to be pulled out from the insertion hole by being rotated in a predetermined direction around the axis. With this configuration, for example, if the head portion at the upper end of the leg portion is provided with an engagement portion (jig engagement portion, e.g., cross-shaped groove) for rotating the clip toward the ascending-direction side of the helix by a predetermined jig, the clip can be detached from the insertion hole by the jig, and the clip can be reused.

The clip attachment structure may include insertion completion notification means configured to cause one or more of sound, a tactile sense, and shape change when the leg portion is inserted to a predetermined depth in the insertion hole. With this configuration, when a worker inserts the clip into the insertion hole, the worker can be notified of completion of the attachment. Thus, the clip can be assuredly inserted to a predetermined depth in the insertion hole. Depending on a place where the attachment work is performed, sound might be hardly heard. Therefore, if notification of attachment completion can be given by tactile sense or shape change, the worker can more easily recognize the attachment completion.

The clip may be attached to the attachment-target member such that the leg portion is inserted into the insertion hole at a stage after penetrating through a through hole of an intervening member separate from the attachment-target member. With this configuration, the intervening member as a third member is interposed between the attachment-target member and the clip firmly attached to each other, thus coming into a held state. Thus, a structure in which these three members are more firmly attached to each other can be achieved.

DESCRIPTION OF THE PREFERRED EMBODIMENTS

Hereinafter, embodiments of this invention will be described with reference to the drawings.

Figure 1:
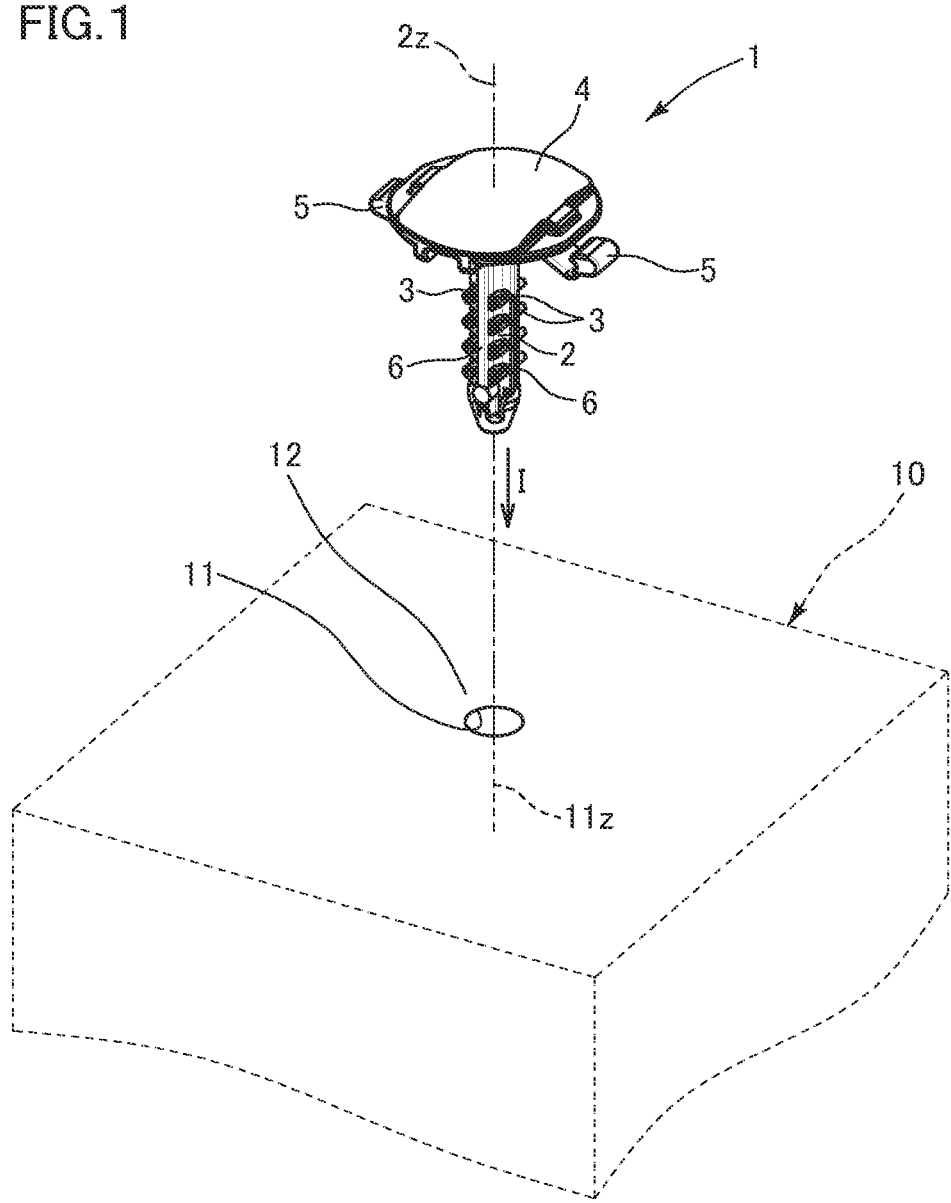
FIG. 1 is an exploded perspective view of a clip attachment structure according to a first embodiment.
Figure 2:
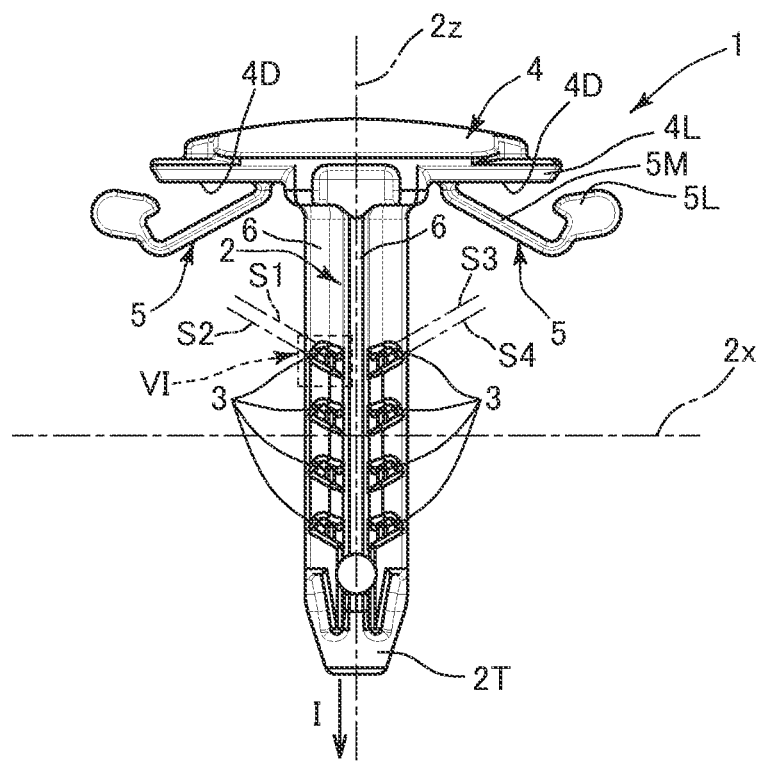
FIG. 2 is a front view of a clip in FIG. 1.
Figure 3:
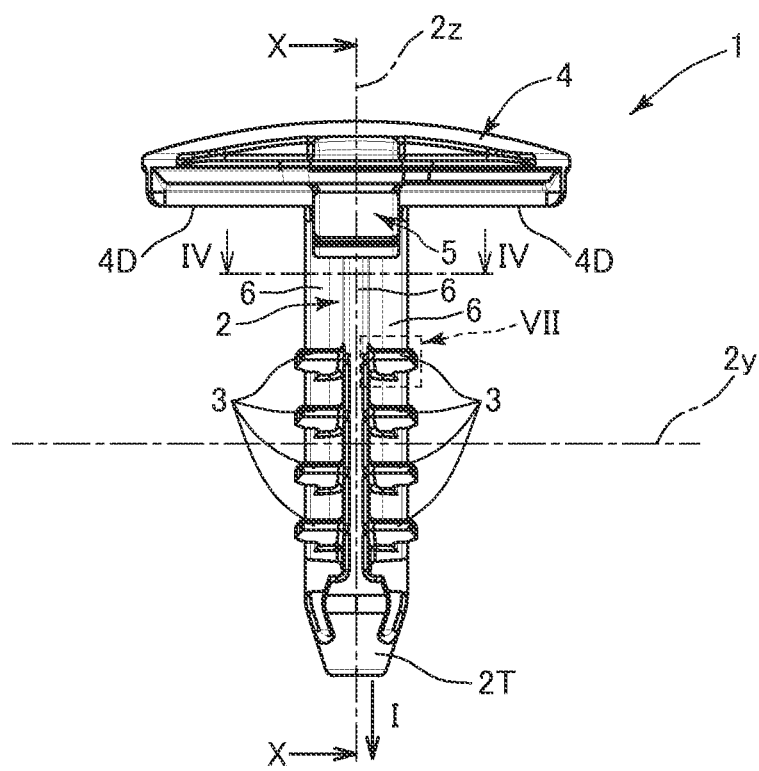
FIG. 3 is a side view of the clip in FIG. 1.

A clip attachment structure according to this embodiment is a structure 100 (see FIG. 12) in which a clip 1 shown in FIGS. 1 to 3 is attached such that a leg portion 2 is inserted into a cylindrical insertion hole 11 of an attachment-target member 10 shown in FIG. 1. Here, the attachment-target member 10 is a vehicular member and has the straight-cylindrical insertion hole 11 having an axis in a direction substantially vertical to a main surface of the attachment-target member 10.

The cylindrical insertion hole in this invention may be any hole having an inner circumferential wall surface forming an annular shape along the same curved surface as the outer circumferential surface of a predetermined cylindrical shape forming a substantially cylindrical shape. The shapes of a bottom surface and an opening of the insertion hole are not particularly limited, and the insertion hole may be a through hole or a bottomed hole. The substantially cylindrical shape includes a case where the shape has error of ±5% for the hole width (diameter) in the radial direction perpendicular to the axis of the insertion hole, and a case where the shape has a draft taper angle of 1 degree or less. Such error is tolerated also for the aforementioned substantially vertical direction.

As shown in FIGS. 2 and 3, the clip 1 has, integrally, a head portion 4, the leg portion 2 protruding downward from the head portion 4, and plate-shaped engagement protrusions 3 extending in an obliquely upward-and-outward direction from the outer circumferential surface of the leg portion 2. Here, the clip 1 and the attachment-target member 10 are formed as injection-molded products of resin.

The leg portion 2 is a columnar part to be inserted from a lower end (distal end) of the head portion 4 into the insertion hole 11 of the attachment-target member 10. The direction (axial direction) of an axis 2z of the leg portion 2 coincides with an insertion direction I into the insertion hole 11.

The head portion 4 has a shape spreading outward (outer circumferential side) from the axis 2z side at the upper end (base end) of the leg portion 2. Here, the head portion 4 spreads substantially in a disk shape centered on the axis 2z. When the leg portion 2 is inserted into the insertion hole 11, a lower surface 4D of the head portion 4 opposes and faces an opening peripheral surface 12 of the insertion hole 11, and therefore the head portion 4 is not inserted into the insertion hole 11 (see FIGS. 10 to 12).

As shown in FIGS. 2 and 3, a plurality of engagement protrusions 3 are formed so as to be arranged at equal intervals in the insertion direction I on the leg portion 2. Each engagement protrusion 3 is formed in a plate shape extending in an obliquely upward-and-outward direction from the outer circumferential surface of the leg portion 2 in a natural state (a non-elastically-deformed state in which elastic deformation is not caused). In each engagement protrusion 3, the distal-end side thereof opposite to the leg portion 2 side can be elastically deformed in the up-down direction, with the leg portion 2 side as a fulcrum.

Figure 4:
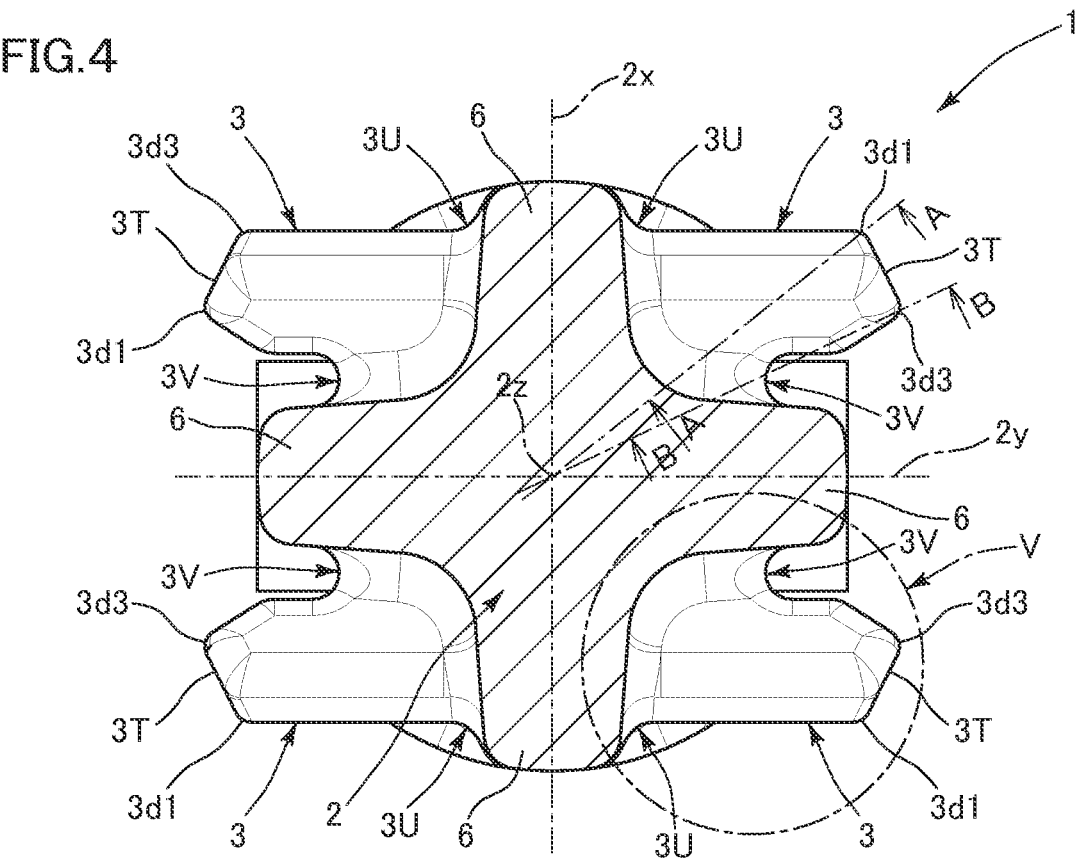
FIG. 4 is a sectional view along line IV-IV in FIG. 3.
Figure 5:
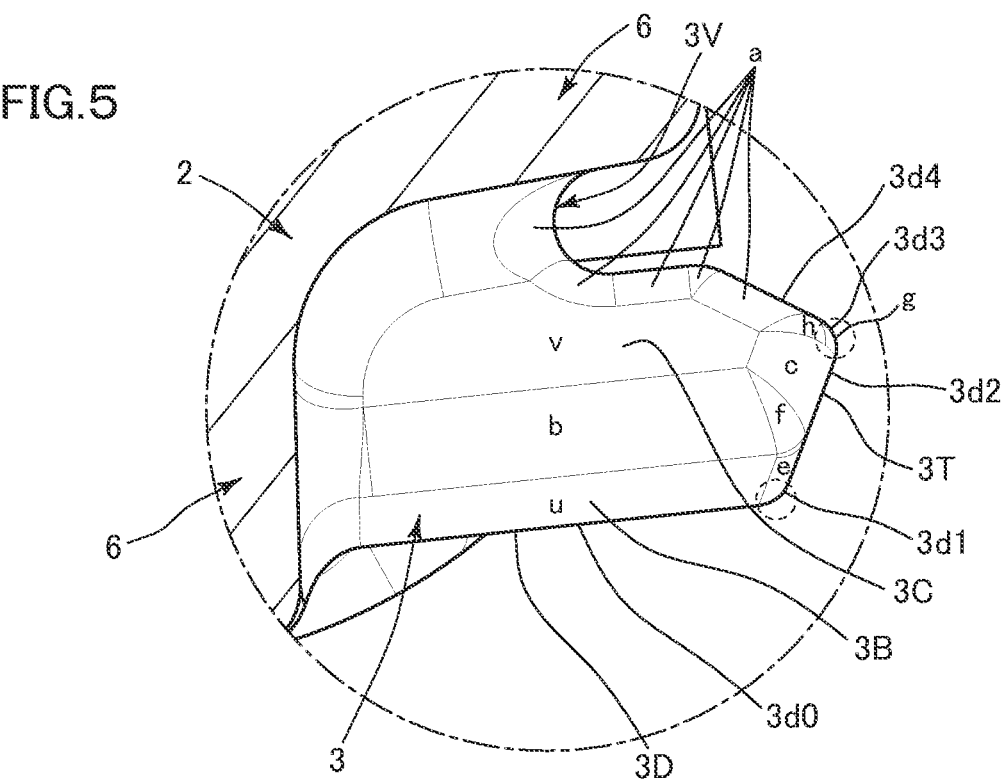
FIG. 5 is an enlarged view of part V in FIG. 4.
Figure 8:
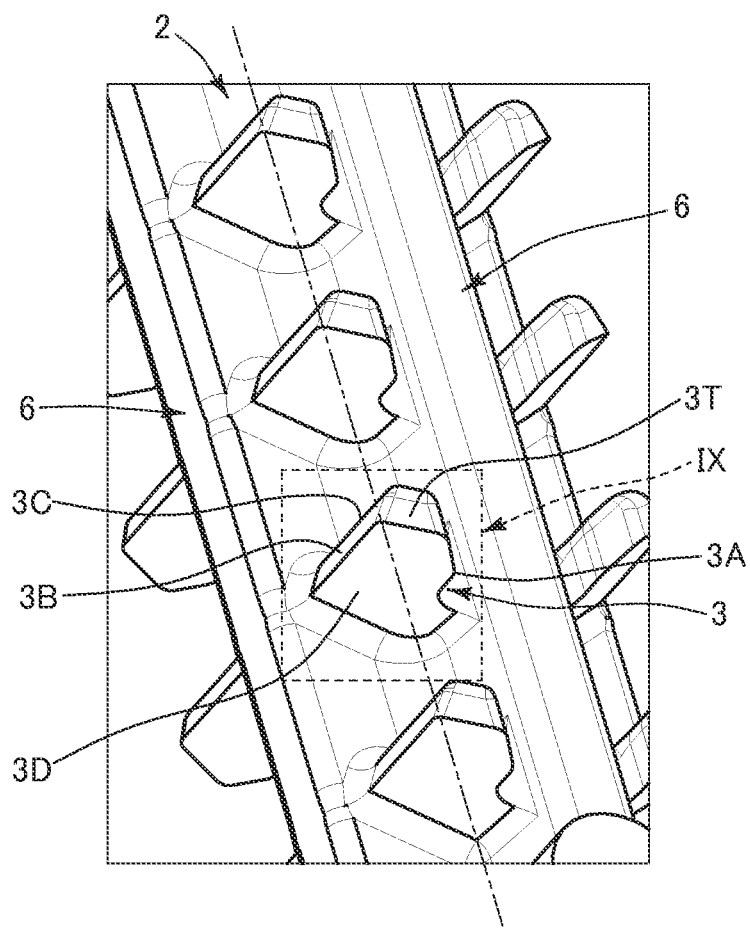
FIG. 8 is an enlarged perspective view of a part of the clip in FIG. 1, as seen from an obliquely lower side.
Figure 9:
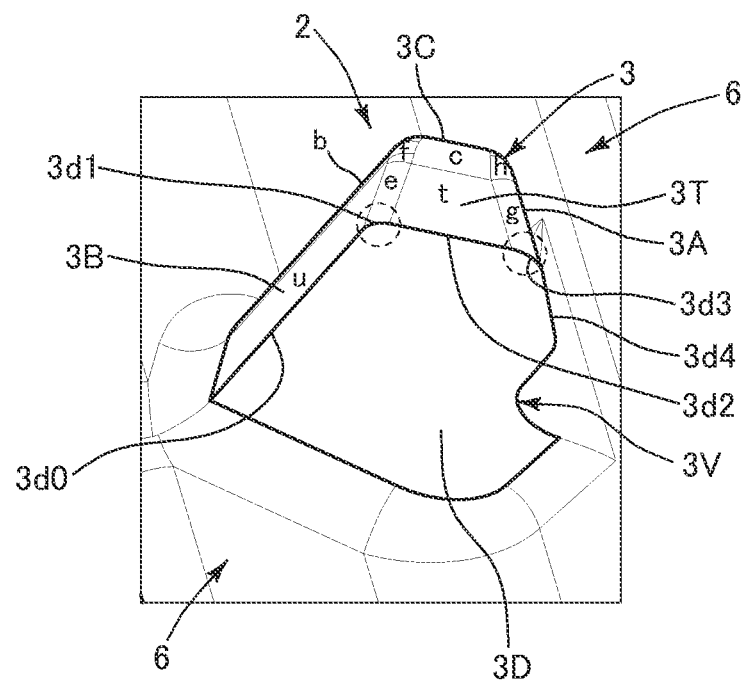
FIG. 9 is an enlarged view of part IX in FIG. 8.
Figure 10:
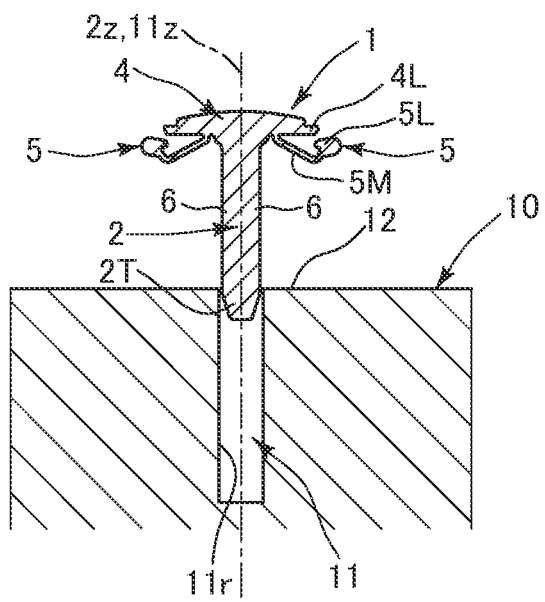
FIG. 10 is a sectional view along line X-X in FIG. 3, illustrating a procedure for attaching the clip in FIG. 1 to an attachment-target member.
Figure 11:
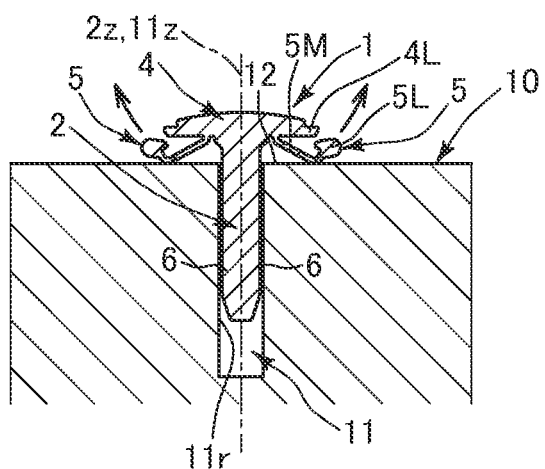
FIG. 11 is a sectional view following FIG. 10.
Figure 12:
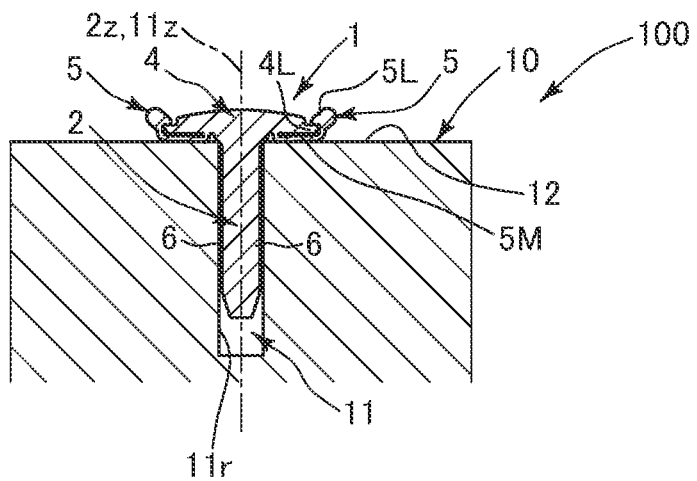
FIG. 12 is a sectional view following FIG. 11.

As shown in FIGS. 4 and 5, each engagement protrusion 3 has an outermost edge portion corresponding to the most distant position from the axis 2z of the leg portion 2, in an outer edge portion of one of an upper surface 3C and a lower surface 3D (here, only the lower surface 3D). Here, as shown in FIGS. 8 and 9, in all the engagement protrusions 3, outermost edge portions 3d1, 3d3 can be specified among outer edge portions 3d0 to 3d4 of the lower surface 3D. At least the outermost edge portions 3d1, 3d3 are formed as sharpened corners sharpened so as to have a corner radius less than 0.2 mm, or more desirably, a corner radius not greater than 0.1 mm. At the time of inserting the clip 1 into the insertion hole 11 and after the insertion (after completion of the insertion) as shown in FIGS. 10 to 12, the sharpened corners 3d1, 3d3 serve as engagement corners (3d1, 3d3) to interfere and engage with an inner circumferential wall surface 11r (see FIGS. 13 to 15 and 16 to 18).

In this embodiment, all the outer edge portions 3d0 to 3d4 of the lower surface 3D of each engagement protrusion 3 are the above-described sharpened corners and have a corner radius of 0 mm. The lower surface 3D is a flat surface. Meanwhile, in each engagement protrusion 3, all the other corners (e.g., corner surfaces a, b, c, e, f, g, h (see FIG. 5)) except for the outer edge portions 3d0 to 3d4 of the lower surface 3D are formed as mild curved (rounded) surfaces. The upper surface 3C is a flat surface.

At the time of insertion into the insertion hole 11, the engagement corners 3d1, 3d3 slide on the inner circumferential wall surface 11r (see FIGS. 14 and 17) and the engagement protrusion 3 is elastically deformed such that the distal-end side (engagement corner 3d1, 3d3 side) thereof is bent upward. Meanwhile, after insertion into the insertion hole 11 (after completion of the insertion), the engagement corners 3d1, 3d3 form an engaged state of digging into the inner circumferential wall surface 11r by elastic restoration of the engagement protrusion 3 (see FIGS. 15 and 18). By this engagement, the clip 1 is prevented from coming off from the insertion hole 11, and the clip 1 is attached to the attachment-target member 10, thus forming the attachment structure 100.

Here, the engagement corners 3d1, 3d3 are lower edges of the corner surfaces e, g, on both end sides in the circumferential direction about the axis 2z, of a distal-end surface 3T at the most distant position from the axis 2z of the leg portion 2 in each engagement protrusion 3 (see inside broken-line circles in FIGS. 5 to 7 and 9). The distal-end surface 3T forms the engagement corners 3d1, 3d3, together with the lower surface 3D, and is an elevation surface extending in the up-down direction from the engagement corners 3d1, 3d3 which are connection portions with the lower surface 3D. Further, the distal-end surface 3T is one of all side surfaces 3A, 3B, 3T of the engagement protrusion 3, and is formed by surfaces t, c, e, f, g, h including a flat center portion and curved corners therearound. The side surface 3A is formed by surfaces s, a (see FIG. 6), and the side surface 3B is formed by surfaces u, b (see FIG. 7).

In this invention, the engagement protrusion is formed to be thicker than the conventional one. More specifically, the engagement protrusion 3 is formed to be thicker not only at the base-end side but over a range up to the distal-end side, and has higher stiffness over the entirety from the base-end side to the distal-end side than the conventional one. Thus, after the leg portion 2 is inserted into the insertion hole 11 (after completion of the insertion), the engagement protrusion 3 more readily digs into the inner circumferential wall surface 11r.

Figure 13:
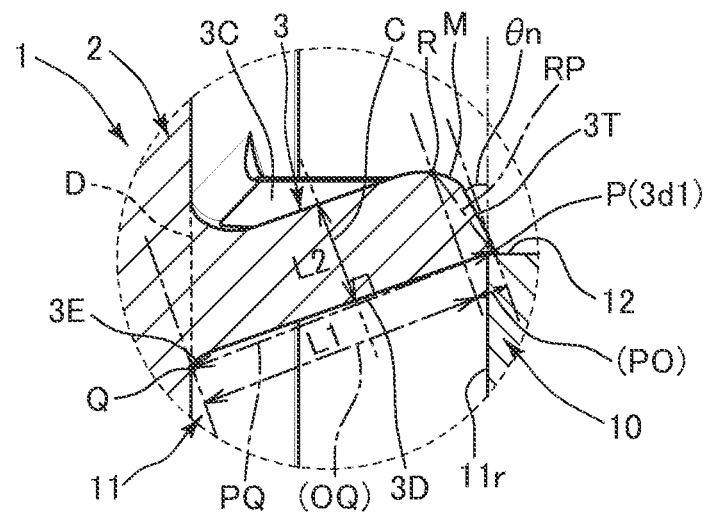
FIG. 13 is a sectional view along line A-A in FIG. 4, schematically showing a first engagement protrusion when the clip is being inserted into an insertion hole.

The plate thickness of the engagement protrusion 3 is set to satisfy the following prescription. That is, the engagement protrusion 3 forming a plate shape is formed to satisfy such a condition that, as shown in FIG. 13, where the length thereof is denoted by L1 and the plate thickness thereof is denoted by L2, the plate thickness L2 is not less than ⅓ of the length L1 (L1×⅓≤L2), in at least an 80% region (OQ) on the leg portion 2 side in the length direction.

In this case, regarding at least one (here, 3d1) of the engagement corners 3d1, 3d3 of each engagement protrusion 3, in a cross-section including the engagement corner (3d1) and the axis 2z of the leg portion 2 (see FIG. 13), the length of a straight line PQ from a vertex P of the engagement corner 3d1 to a connection point Q between the engagement protrusion 3 and the leg portion 2 is defined as the length L1 of the engagement protrusion 3. Further, in a direction perpendicular to, of the upper and lower surfaces of the engagement protrusion 3, the surface having the engagement corners 3d1, 3d3 (here, lower surface 3D), a length from the surface (lower surface 3D) to the other surface (upper surface 3C) is defined as the plate thickness L2 of the engagement protrusion 3. The length direction of the engagement protrusion 3 is defined as the extending direction of the straight line PQ. In the case where the engagement protrusion 3 has a plurality of engagement corners 3d1, 3d3 as in this embodiment, the above relationship between L1 and L2 need not be satisfied for all the plurality of engagement corners 3d1, 3d3, and only has to be satisfied for one or more of them (here, 3d1).

Further, in a 20% region (PO) on the distal-end side opposite to the leg portion 2 in the length direction of the engagement protrusion 3, the plate thickness L2 of the engagement protrusion 3 here is prescribed as follows. That is, the engagement protrusion 3 is prescribed such that, in the 20% region (PO) on the distal-end side of the engagement protrusion 3 in the above cross-section (see FIG. 13), an outer edge line M formed by end points, on the side opposite to the straight line PQ, of a cut line C cutting the engagement protrusion 3 along the direction perpendicular to the straight line PQ passes a position coinciding with a straight line RP extending from an end R on the leg portion 2 side of the outer edge line M to the vertex P of the engagement corner 3d1, or a position outward thereof (on the side away from the straight line PQ).

The engagement protrusion 3 having the plate thickness L2 prescribed as described above is formed to be thicker than the conventional one, and has such a shape that the distal-end surface 3T proximally opposes the inner circumferential wall surface 11r of the insertion hole 11 at the time of inserting the leg portion 2 into the insertion hole 11 and after the insertion. In this embodiment, the distal-end surface 3T of the engagement protrusion 3 approaches the inner circumferential wall surface 11r such that parts (engagement corners 3d1, 3d3) of the lower edge dig into the inner circumferential wall surface 11r and also the upper-edge side comes close to the inner circumferential wall surface 11r, so that the entire distal-end surface 3T forms a surface inclined from the inner circumferential wall surface 11r. Here, when the engagement protrusion 3 is in the natural state (non-elastically-deformed state) (see FIGS. 13 and 16), at both the engagement corner 3d1 and the engagement corner 3d3, an angle θn in the radial direction between the distal-end surface 3T and the direction of the axis 2z is not less than 0 degrees and not greater than 30 degrees, or the distal-end surface 3T and the direction of the axis 2z are parallel to each other.

Here, θn is shown as an angle between the distal-end surface 3T and the inner circumferential wall surface 11r substantially parallel to the axis 2z when the engagement protrusion 3 is in the natural state (non-elastically-deformed state). In FIGS. 14, 15, 17, and 18, θs and θb denote angles between the distal-end surface 3T and the direction of the axis 2z (inner circumferential wall surface 11r) when the engagement protrusion 3 slides on the inner circumferential wall surface 11r or the engagement protrusion 3 is in an engaged state.

As shown in FIGS. 2 and 3, the clip 1 has reinforcement plate portions 6. The reinforcement plate portions 6 have plate shapes extending in the insertion direction I and protruding outward from a plurality of positions in the circumferential direction on the outer circumferential surface of the leg portion 2 (here, from four sides of the outer circumferential surface; see FIG. 4). Here, each engagement protrusion 3 is formed over an area between the reinforcement plate portions 6 adjacent to each other in the circumferential direction. Thus, the strength and stiffness of the engagement protrusion 3 are enhanced, so that the engagement protrusion 3 assuredly digs into the inner circumferential wall surface 11r (see FIG. 7).

As shown in FIGS. 4 and 5, each engagement protrusion 3 is cut out on the outer sides of neighboring connection areas with both reinforcement plate portions 6 connected on both sides in the circumferential direction, so that cutouts 3V, 3U are formed. Thus, elasticity of the engagement protrusion 3 is slightly enhanced on the distal-end side (distal-end surface 3T side), thereby facilitating insertion into the insertion hole 11 to a certain extent.

Figure 15:
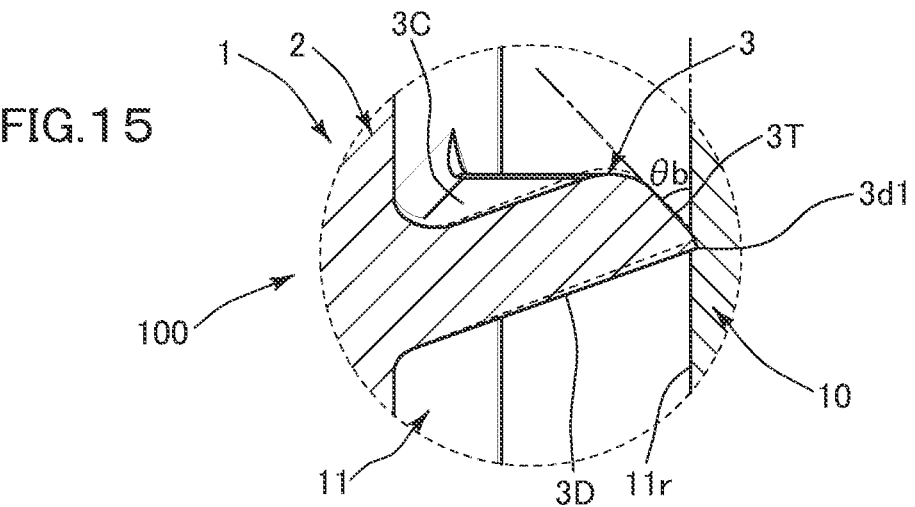
FIG. 15 is a sectional view following FIG. 14.
Figure 16:
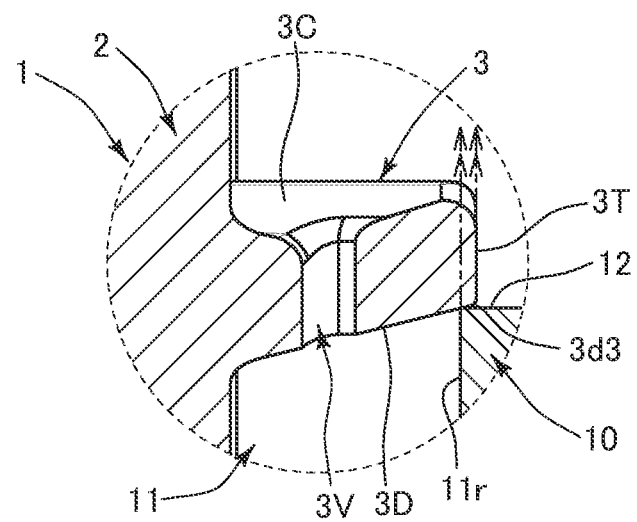
FIG. 16 is a sectional view along line B-B in FIG. 4, schematically showing a second engagement protrusion when the clip is being inserted into the insertion hole.
Figure 17:
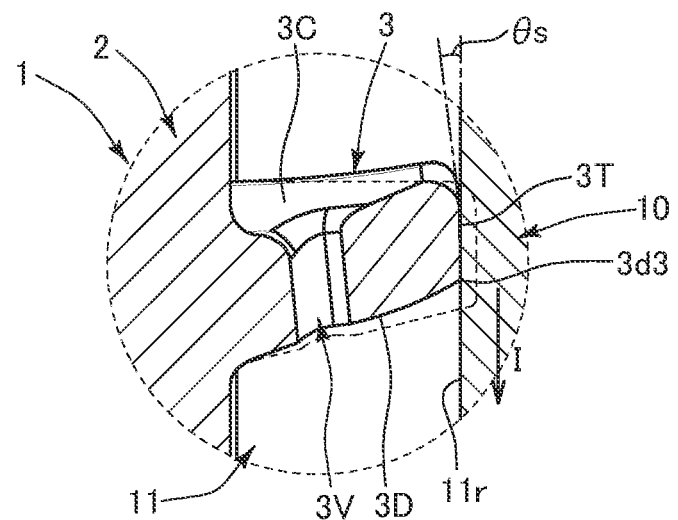
FIG. 17 is a sectional view following FIG. 16.
Figure 18:
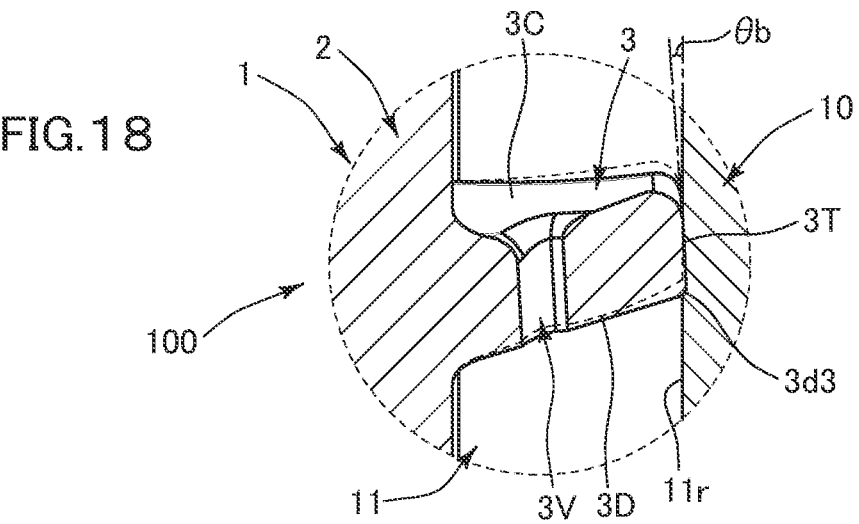
FIG. 18 is a sectional view following FIG. 17.

The cutout 3V does not appear in a cross-section including the engagement corner 3d1 and the axis 2z of the leg portion 2 (A-A cross-section in FIG. 4; see FIGS. 13 to 15), but appears in a cross-section including the engagement corner 3d3 and the axis 2z of the leg portion 2 (B-B cross-section in FIG. 4; see FIGS. 16 to 18). That is, in the engagement protrusion 3, on the engagement corner 3d3 side, the cutout 3V is present at an intermediate part, so that the distal-end side (engagement corner 3d1 side) which is the outer side from the cutout 3V is a little more bendable. Therefore, the engagement protrusion 3 in this embodiment has the first engagement corner 3d1 where high stiffness is imparted over a range up to the distal-end side, thus having an effect of deeply and assuredly digging into the inner circumferential wall surface 11r of the insertion hole 11, and the second engagement corner 3d3 where the distal-end side is more bendable than on the first engagement corner 3d1 side owing to the cutout 3V, thus having an effect of facilitating insertion by elastic deformation. In the case where there are a plurality of engagement corners in the engagement protrusion 3, the plate thickness L2 of the engagement protrusion 3 only has to be prescribed using at least one of the engagement corners as a reference. In this embodiment, the first engagement corner 3d1 is used as a reference, and L1 and L2 defined using the first engagement corner 3d1 as a reference satisfy the above prescription of the plate thickness L2 (see FIG. 13).

The engagement protrusion 3 in this embodiment will be described more specifically.

As shown in FIG. 2, the engagement protrusions 3 are formed symmetrically with respect to the axis 2z between a first side (right side in FIG. 2) and a second side (left side in FIG. 2) opposite thereto in a first perpendicular direction 2x of perpendicular directions (radial directions) perpendicular to the axis 2z of the leg portion 2. In addition, as shown in FIG. 3, the engagement protrusions 3 are formed symmetrically with respect to the axis 2z also between a first side (right side in FIG. 3) and a second side (left side in FIG. 3) opposite thereto in a second perpendicular direction 2y perpendicular to both the axis 2z and the first perpendicular direction 2x. As shown in FIG. 4, the engagement protrusions 3 in this embodiment are formed such that four engagement protrusions 3 are present so as to surround the leg portion 2 along the circumferential direction of the leg portion 2, and a plurality of sets of the four engagement protrusions 3 are arranged at predetermined intervals in the direction of the axis 2z (axial direction).

Figure 6:
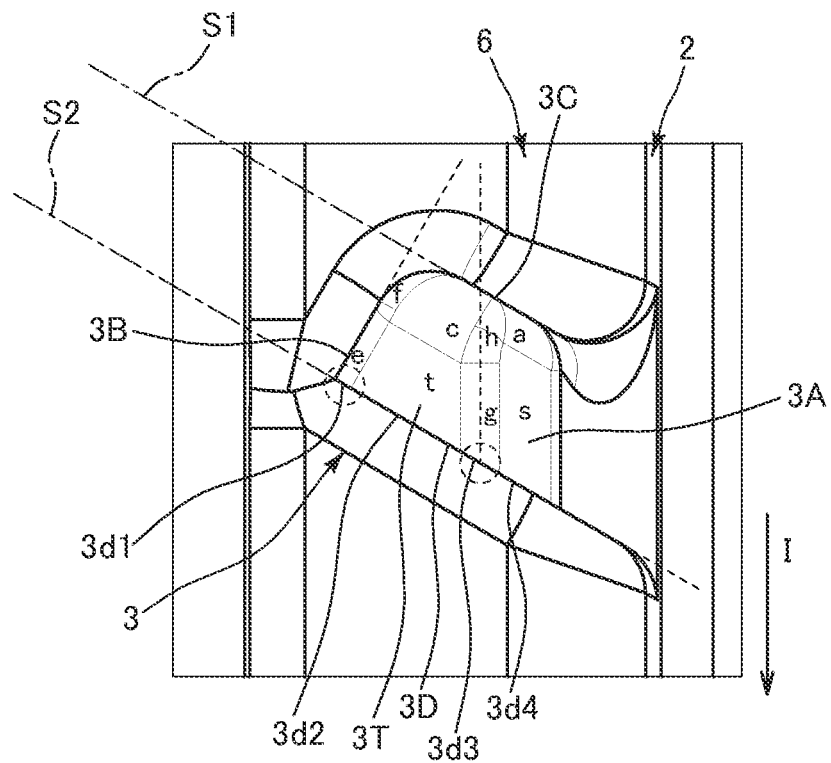
FIG. 6 is an enlarged view of part VI in FIG. 2.
Figure 7:
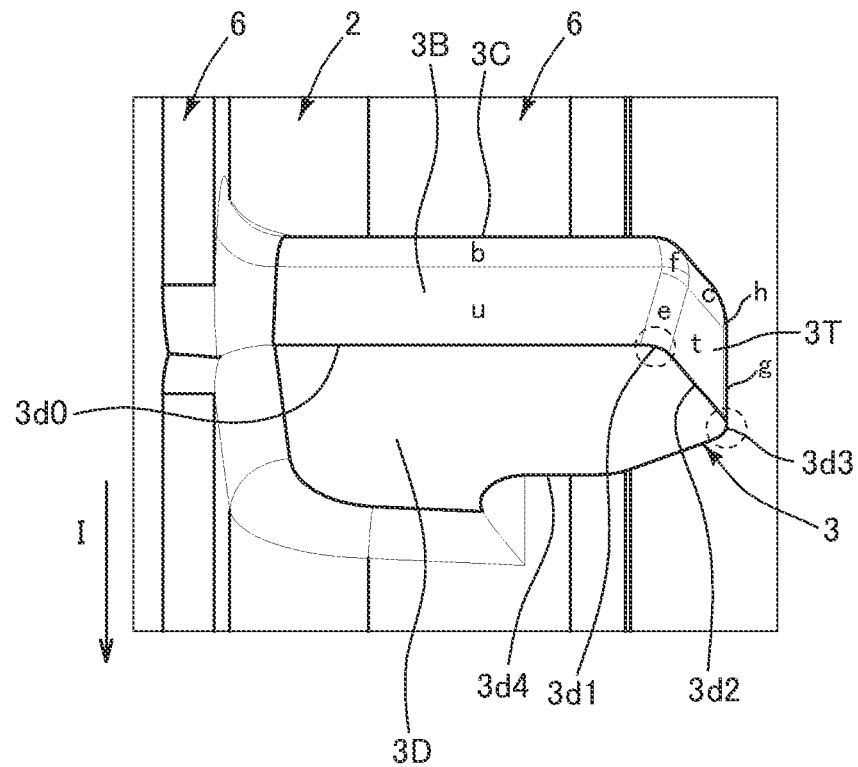
FIG. 7 is an enlarged view of part VII in FIG. 3.

In FIG. 4, two pairs of engagement protrusions 3 respectively present adjacently across the reinforcement plate portions 6 on the first side (upper side in FIG. 4) and the second side (lower side in FIG. 4) in the first perpendicular direction 2x, correspond to, in FIG. 2, the engagement protrusions 3 shown on the front sides of the left and right reinforcement plate portions 6, and the engagement protrusion 3 present on the back sides of the left and right reinforcement plate portions 6 and therefore not shown. The pair of engagement protrusions 3 present on the front and back sides of the reinforcement plate portion 6 at the left in FIG. 2 form flat-plate shapes extending in an obliquely upward-and-outward direction (obliquely upward-and-leftward direction in FIG. 2) at the same angle with respect to the axis 2z of the leg portion 2 in the first perpendicular direction 2x, and as shown in FIG. 6, both upper surfaces 3C on the shallow side and both lower surfaces 3D on the deep side in the insertion direction I extend on the same planes S1 and S2, respectively. Here, the planes S1 and S2 are parallel to each other. Meanwhile, the pair of engagement protrusions 3 present on the front and back sides of the reinforcement plate portion 6 at the right in FIG. 2 form flat-plate shapes extending in an obliquely upward-and-outward direction (obliquely upward-and-rightward direction in FIG. 2) at the same angle with respect to the axis 2z of the leg portion 2 in the first perpendicular direction 2x, and as in the relationships between the upper surface 3C and S1 and between the lower surface 3D and S2 in FIG. 6, both upper surfaces 3C on the shallow side and both lower surfaces 3D on the deep side in the insertion direction I extend on the same planes S3 and S4, respectively. Here, the planes S3 and S4 are also parallel to each other.

As shown in FIG. 2, the clip 1 has elastic latch pieces 5 as insertion completion notification means of this invention.

When the leg portion 2 is inserted to a predetermined depth in the insertion hole 11 and thus the insertion is completed, the insertion completion notification means causes at least one of sound, a tactile sense, and shape change, thereby notifying an attachment worker that the attachment is completed.

In this embodiment, each elastic latch piece forming the insertion completion notification means has an elastic piece portion 5M extending from the lower surface 4D of the head portion 4 (or from the upper-end side of the leg portion 2) obliquely outward so as to be separated from the leg portion 2 toward the insertion direction I in the natural state (non-elastically-deformed state), and a distal-end latch portion 5L provided at the distal end of the elastic piece portion 5M and being capable of forming a latched state in which the elastic piece portion 5M is elastically deformed toward the shallow side in the insertion direction I so that the distal-end latch portion 5L moves around to the upper side of the outer edge of the head portion 4 so as to be latched, thereby preventing restoration to the natural state position.

The elastic latch piece 5 is formed such that, in the elastic piece portion 5M, the base-end side connected to the head portion 4 (or leg portion 2) is more readily elastically deformable than the other region in the length direction of the elastic piece portion 5M. Thus, as shown in FIGS. 10 to 12, the distal-end side of the elastic latch piece 5 can be swung (pivoted) up/down with the base-end side as a fulcrum. Through this swing, the elastic latch piece 5 can bring the distal-end latch portion 5L close to an outer edge latch portion 4L provided at the outer edge of the head portion 4, and further, by riding over the outer edge latch portion 4L, can form a latched state with the outer edge latch portion 4L (a downward-detachment prevented state; see FIG. 12).

Then, the attachment worker can perceive sound and a tactile sense caused when the distal-end latch portion 5L rides over the outer edge latch portion 4L, and further can visually recognize shape change thereof. Thus, the attachment worker can recognize that the leg portion 2 of the clip 1 is inserted to a predetermined depth in the insertion hole 11 and attachment is completed. In this latched state, the elastic piece portion 5M is pressed to the lower surface 4D side of the head portion 4 by the opening peripheral surface 12 of the insertion hole 11 and thus is kept in a state of extending outward along the lower surface 4D.

Here, the elastic latch pieces 5 are formed on both sides across the axis 2z in the direction perpendicular to the axis 2z (here, the first perpendicular direction 2x). In addition, in the head portion 4, the outer edge latch portions 4L to be latched with the distal-end latch portions 5L of the elastic latch pieces 5 are formed as thin portions which are thinner than the center area around the axis 2z so that the distal-end latch portions 5L can easily ride over them.

The attachment procedure for attaching the clip 1 to the attachment-target member 10 will be described with reference to FIGS. 10 to 18.

First, as shown in FIG. 10, the leg portion of the clip 1 is inserted into the cylindrical insertion hole 11 of the attachment-target member 10 from the distal end 2T positioned opposite to the head portion 4 such that both axes 2z and 11z coincide with each other. The distal end 2T of the leg portion 2 is tapered so as to facilitate insertion into the insertion hole 11.

As the leg portion 2 is inserted into the insertion hole 11, the four engagement protrusions 3 at the lowermost stage among the engagement protrusions 3 come into contact with the opening peripheral surface 12 of the insertion hole 11 (see FIGS. 13 and 16). Then, by further pushing the leg portion 2 into the insertion hole 11, each engagement protrusion 3 is pushed into the insertion hole 11 while the distal-end side thereof is elastically deformed toward the shallow side (upper side) in the insertion direction I, and thus the leg portion 2 is further inserted while the engagement corners 3d1, 3d3 slide on the inner circumferential wall surface 11r (see FIGS. 14 and 17). After the engagement protrusions 3 at the lowermost stage are pushed into the insertion hole 11, the engagement protrusions 3 at the next stage come into contact with the opening peripheral surface 12 of the insertion hole 11, and then, after they are pushed into the insertion hole 11, the engagement protrusions 3 at the further next stage come into contact with the opening peripheral surface 12. That is, for every time of the contact, the leg portion 2 is further pushed into the insertion hole 11, whereby the leg portion 2 is inserted into the insertion hole 11. In all the engagement protrusions 3 pushed into the insertion hole 11, the distal-end sides thereof are elastically deformed to bend upward, and the engagement corners 3d1, 3d3 thereof slide on the inner circumferential wall surface 11r (see FIGS. 14 and 17).

However, actually, rather than pushing the engagement protrusions 3 into the insertion hole 11 stage by stage sequentially, the attachment worker pushes them into the insertion hole 11 entirely by one pushing operation through the stages up to the final stage (uppermost stage) of the engagement protrusions 3 or near the final stage.

As the engagement protrusions 3 are moved into the insertion hole 11, the elastic latch pieces 5 come into contact with the opening peripheral surface 12 of the insertion hole 11 as shown in FIG. 11. With further movement, the elastic latch pieces 5 are pushed up by the opening peripheral surface 12 so as to approach the head portion 4, and are swung (pivoted) with the base-end sides as fulcrums. Thus, the distal-end latch portions 5L approach the outer edges of the head portion 4 from the lower side. Then, when the engagement protrusions 3 at the final stage (uppermost stage) are moved into the insertion hole 11 and thus the leg portion 2 is inserted to a predetermined depth in the insertion hole 11, the elastic latch pieces 5 are further swung (pivoted), and as shown in FIG. 12, the distal-end latch portions 5L ride over the outer edges of the head portion 4, so as to be latched with the outer edges (outer edge latch portions 4L) at positions after the riding, thus coming into a latched state. Thus, the insertion of the clip 1 into the insertion hole 11 is completed and the attachment structure 100 is formed.

Figure 14:
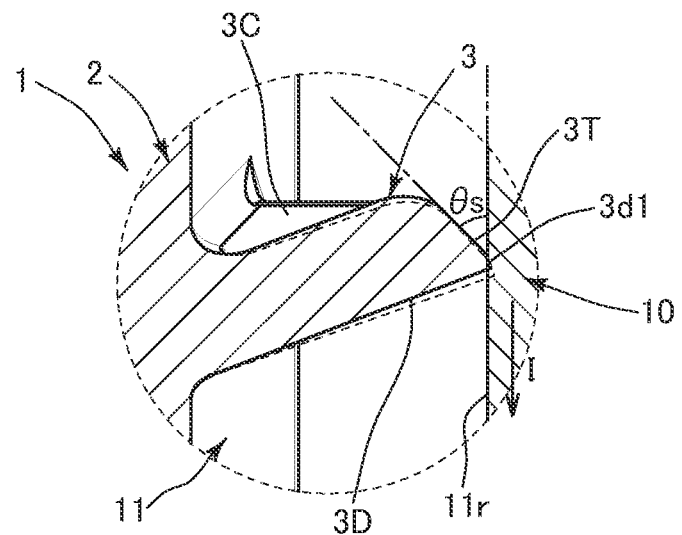
FIG. 14 is a sectional view following FIG. 13.

While the leg portion 2 is moving into the insertion hole 11, as shown in FIGS. 14 and 17, the distal-end side of each engagement protrusion 3 slides on the inner circumferential wall surface 11r while bending toward the direction (upward) opposite to the insertion direction I by the force of inserting the clip 1 into the insertion hole 11. Then, when the insertion of the clip 1 into the insertion hole 11 is completed and the insertion force is eliminated, the engagement protrusion 3 is elastically restored so that the engagement corners 3d1, 3d3 start to dig into the inner circumferential wall surface 11r. Thus, as shown in FIGS. 15 and 18, owing to the digging, the leg portion 2 of the clip 1 is fixed to the insertion hole 11 in a come-off prevented state. In this way, the clip 1 is fixed while forming an engaged state of digging into the insertion hole 11, thus forming the attachment structure 100 to the attachment-target member 10.

In this embodiment, when the above digging is further advanced, not only the engagement corners 3d1, 3d3 but also the sharpened corner 3d2 connecting these digs into the inner circumferential wall surface 11r. However, while the clip 1 is being inserted into the insertion hole 11, the sharpened corner 3d2 has no contact with the inner circumferential wall surface 11r and does not slide on the inner circumferential wall surface 11r. Therefore, even though the sharpened corner 3d2 does not have sliding resistance during insertion of the clip 1, the sharpened corner 3d2 serves as a sub engagement corner (which may be referred to as auxiliary engagement corner) that can dig into the inner circumferential wall surface 11r after the insertion. The sub engagement corner may be absent as long as the engagement corners are present.

At the time of inserting the clip 1 into the insertion hole 11, the attachment worker for the clip 1 can hear contact sound caused at each time as the engagement protrusions 3 sequentially hit and contact with the opening peripheral surface 12 of the insertion hole 11. In addition, the attachment worker can also perceive a tactile sense due to the contact, as well as the contact sound. However, since the engagement protrusions 3 are formed in the same shape, the attachment worker cannot determine, with only the contact sound and the tactile sense, whether or not the clip 1 is inserted to a predetermined depth in the insertion hole 11, i.e., whether or not the insertion is completed.

Regarding this, in this embodiment, when the insertion of the clip 1 into the insertion hole 11 is completed, the distal-end latch portions 5L of the elastic latch pieces 5 ride over the outer edges of the head portion 4 and thus come into a latched state of being latched with the outer edges at positions after the riding. With this latching, sound and a tactile sense are caused, whereby completion of the insertion of the clip 1 into the insertion hole 11 can be determined. The engagement protrusions 3 and the elastic latch pieces 5 are completely different from each other in stiffness and shape, and therefore cause completely different sounds and tactile senses. Thus, the sound and the tactile sense of the latching can be recognized so as to be clearly distinguished from those caused by the engagement protrusions 3. Further, since the latched state of the elastic latch pieces 5 is visually apparent, completion of the insertion can be determined also by visual recognition.

Although one embodiment of this invention has been described above, this embodiment is merely illustrative, this invention is not limited thereto, and various modifications such as additions and omissions may be made on the basis of the knowledge of a person skilled in the art without departing from the scope of the claims.

Hereinafter, embodiments other than the above embodiment, and modifications thereof will be described. It is noted that parts having the same functions as those in the above embodiment are denoted by the same reference characters, and the detailed description thereof is omitted. The above embodiment, and the following modifications and other embodiments, may be combined to be implemented as appropriate as long as no technical contradiction arises.

The attachment-target member 10 in the above embodiment may be any member that at least has a cylindrical insertion hole, and is not limited to the above-described one.

The insertion completion notification means (elastic latch pieces 5) in the above embodiment enables the attachment worker to recognize completion of insertion of the clip 1 into the insertion hole 11 by sound, a tactile sense, and shape change. However, the insertion completion notification means only has to cause at least one of sound, a tactile sense, and shape change when the insertion is completed. Among these, if one or both of a tactile sense and shape change can be caused, the attachment worker can recognize completion of the insertion even when the working space is in a harsh condition due to noise or the like. In this invention, the insertion completion notification means (elastic latch pieces 5 in the above embodiment) may be omitted.

A first modification of the above embodiment will be described with reference to FIGS. 19 to 22.

Figure 19:
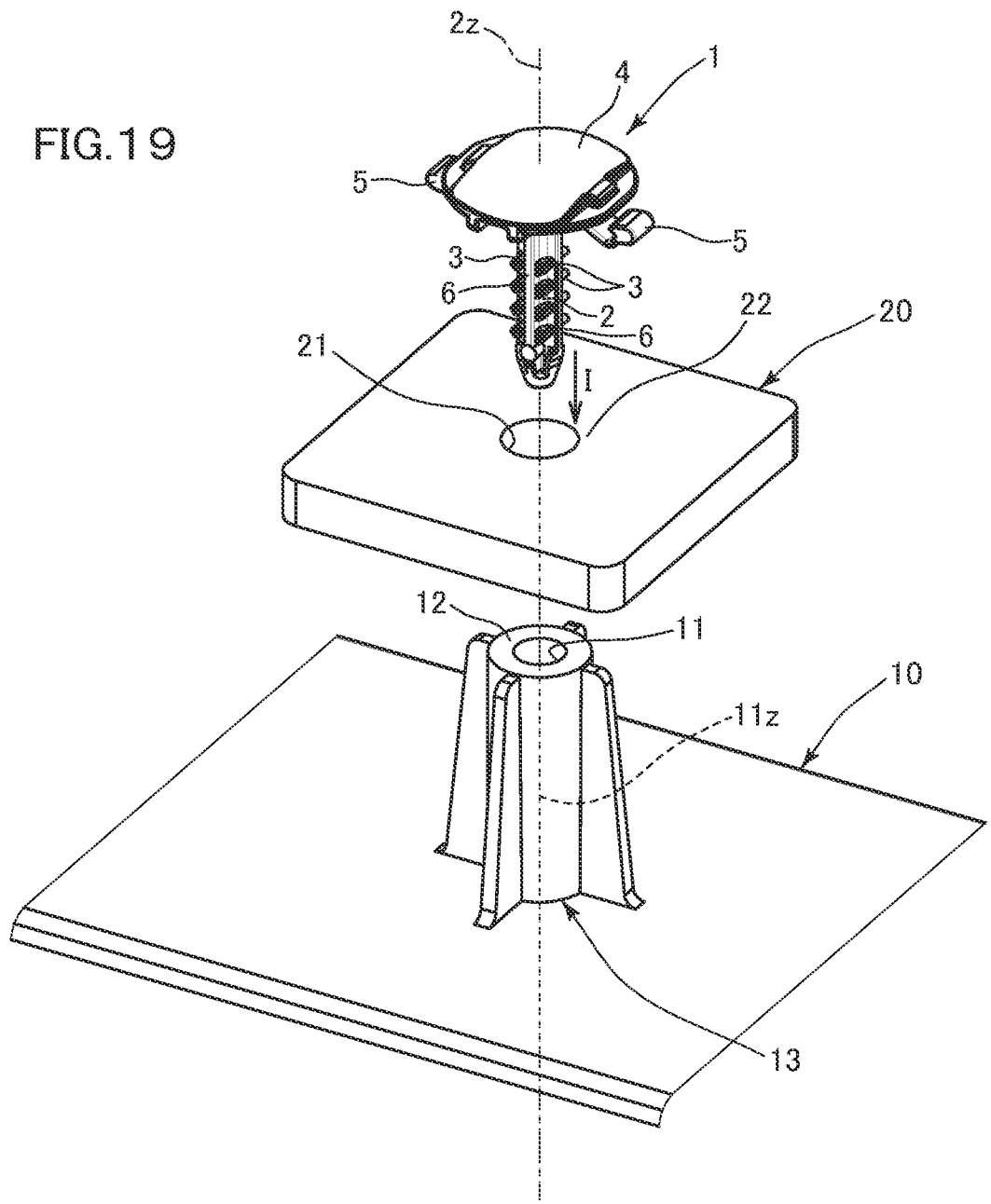
FIG. 19 is an exploded perspective view of a clip attachment structure according to a first modification.
Figure 20:
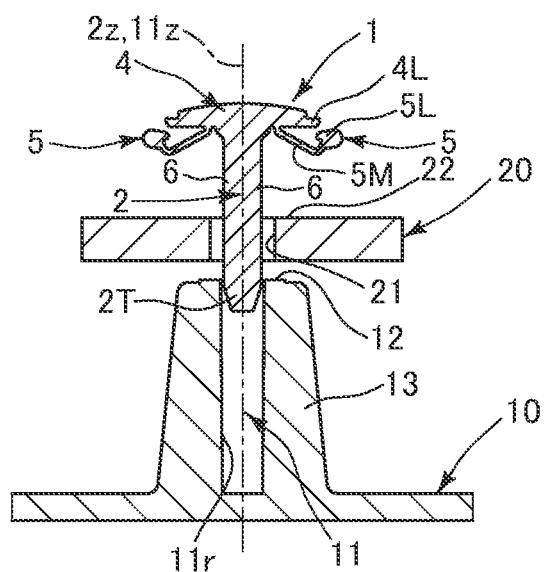
FIG. 20 is a sectional view illustrating a procedure for attaching a clip in FIG. 19 to an attachment-target member.
Figure 21:
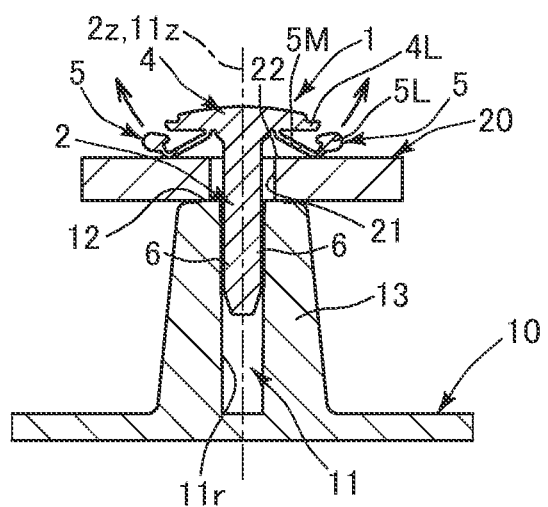
FIG. 21 is a sectional view following FIG. 20.
Figure 22:
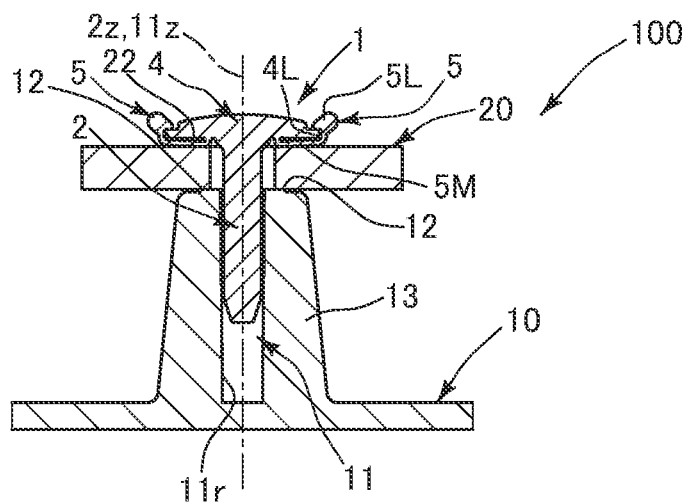
FIG. 22 is a sectional view following FIG. 21.

In the first modification, as shown in FIG. 19, the clip 1 having the same shape as in the above embodiment, the attachment-target member 10 (here, plate-shaped member) having a boss 13 protruding in a tubular shape, and an intervening member 20 (counterpart member) to be held between the head portion 4 of the clip 1 and the attachment-target member 10, are provided to form the attachment structure 100 (see FIG. 22). A through hole 21 is formed in the intervening member 20, and the attachment-target member 10 has the cylindrical insertion hole 11 formed in the boss 13 protruding from a main surface thereof. The clip 1 is attached to the attachment-target member 10 such that the leg portion 2 is inserted into the insertion hole 11 at a stage after penetrating through the through hole 21 of the plate-shaped intervening member 20. Thus, the attachment structure 100 (see FIG. 22) of the clip 1 is formed with the intervening member 20 held between the attachment-target member 10 and the clip 1. That is, the attachment structure 100 is such a structure that the intervening member 20 is assembled with the attachment-target member 10 using the clip 1.

In this case, the attachment procedure for attaching the clip 1 to the attachment-target member 10 is as follows. First, the leg portion 2 is inserted into the through hole 21 of the plate-shaped intervening member 20, and at the subsequent stage, the leg portion is inserted also into the insertion hole 11 of the attachment-target member 10 (see FIG. 20). Thereafter, the leg portion 2 is inserted into the through hole 21 and the insertion hole 11 in the same manner as in the above embodiment (see FIG. 21 and then FIG. 22). The insertion of the leg portion 2 into the insertion hole 11 is also the same as in the above embodiment, and thus is performed such that the engagement protrusions 3 slide on the inner circumferential wall surface 11r while being elastically deformed (see FIG. 14). When the engagement protrusions 3 at the final stage (uppermost stage) move into the insertion hole 11 and the leg portion 2 is inserted to a predetermined depth in the insertion hole 11, as shown in FIG. 22, the intervening member 20 abuts on (closely contacts with) the opening peripheral surface 12 of the attachment-target member 10, and on the opposite side, an opening peripheral surface 22 around the through hole 21 of the intervening member 20 comes into contact with the elastic latch pieces 5 (insertion completion notification means), and then the opening peripheral surface 22 pushes up the elastic latch pieces 5 so as to approach the head portion 4. With this pushing, the distal-end latch portions 5L of the elastic latch pieces 5 ride over the outer edges of the head portion 4, to come into a latched state. Thus, the insertion of the clip 1 into the insertion hole 11 is completed. This completion can be recognized by the attachment worker through sound and a tactile sense due to the latching, visual recognition of the latched state (visual recognition of shape change), and the like, as in the above embodiment. In addition, at the time of the completion, the engagement protrusions 3 dig into the inner circumferential wall surface 11r of the insertion hole 11, as in the above embodiment (see FIG. 15).

A second modification of the above embodiment will be described with reference to FIGS. 23 to 26.

Figure 23:
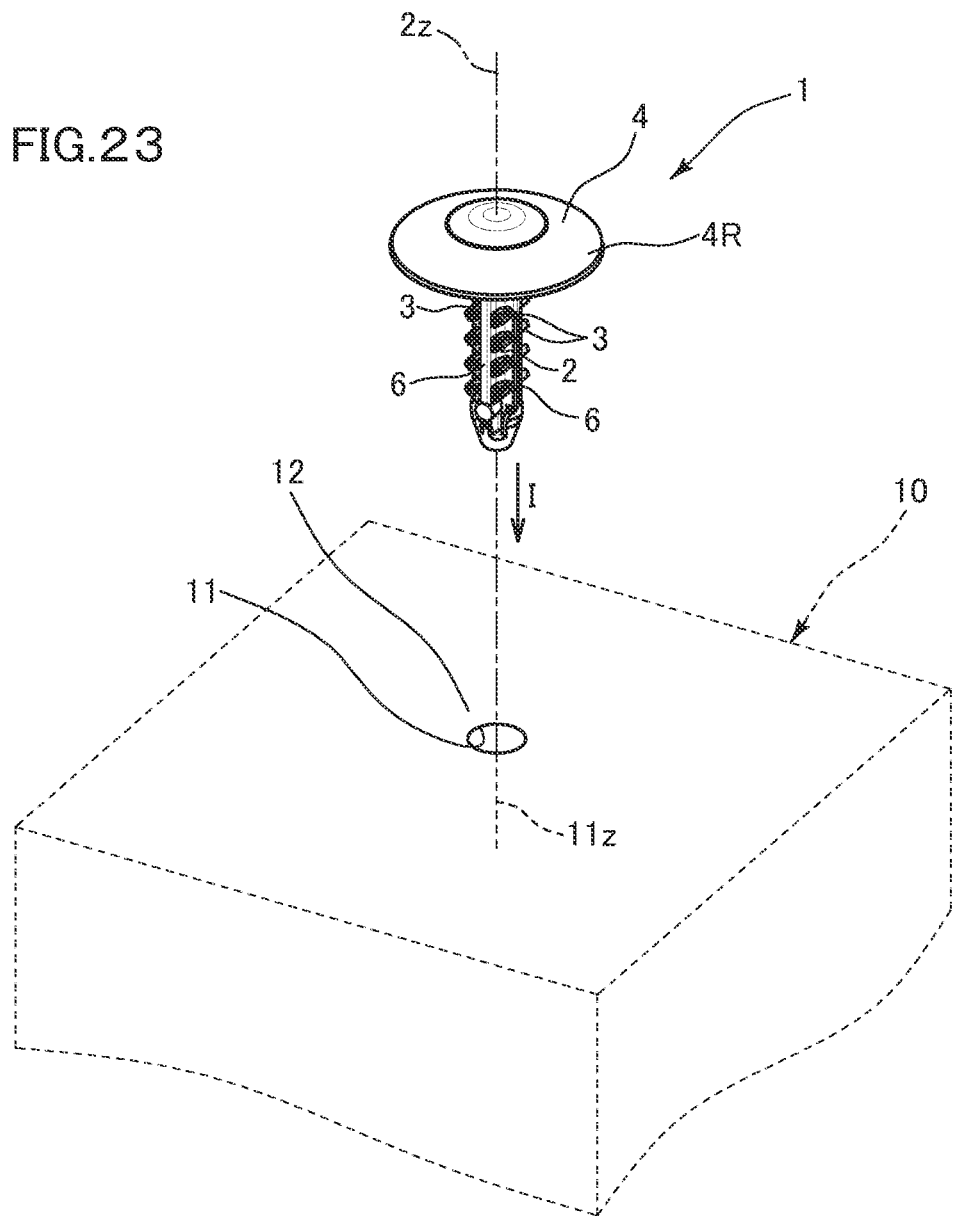
FIG. 23 is an exploded perspective view of a clip attachment structure according to a second modification.
Figure 26:
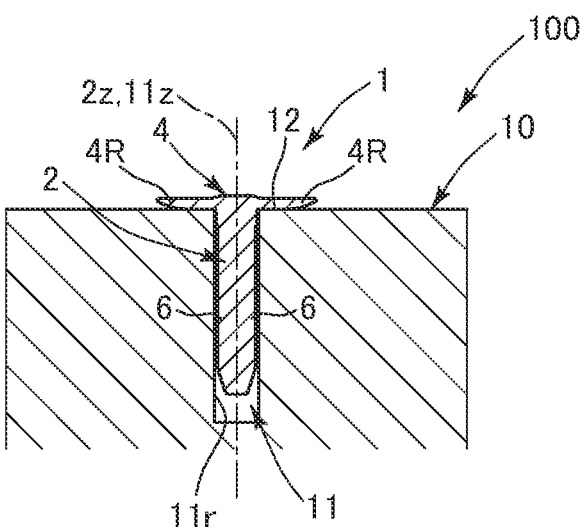
FIG. 26 is a sectional view following FIG. 25.

In the second modification, as shown in FIG. 23, the clip 1 having the same shape as in the above embodiment except for the head portion 4, and the attachment-target member 10 having the cylindrical insertion hole 11, are provided to form the attachment structure 100 (see FIG. 26). The head portion 4 has an umbrella shape spreading outward from the base end of the leg portion 2 toward the distal-end side of the leg portion 2, and an outer circumferential portion 4R thereof serves as the insertion completion notification means of this invention.

Figure 24:
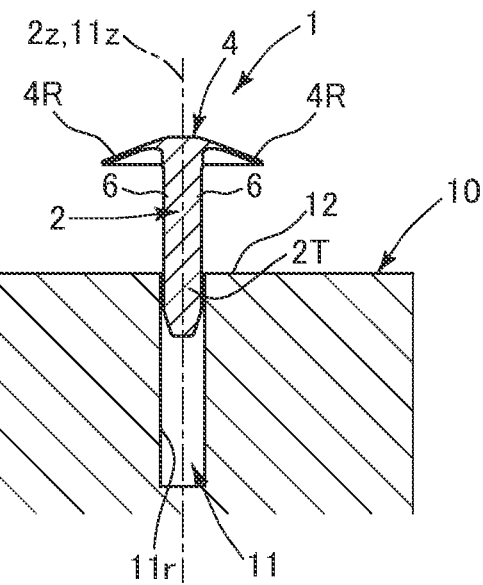
FIG. 24 is a sectional view illustrating a procedure for attaching a clip in FIG. 23 to an attachment-target member.
Figure 25:
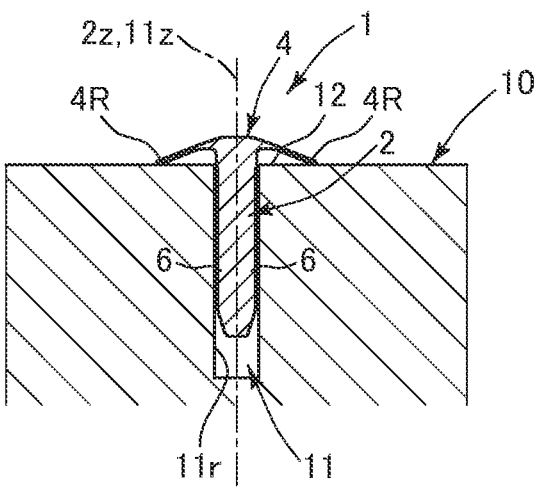
FIG. 25 is a sectional view following FIG. 24.

In this case, the attachment procedure for attaching the clip 1 to the attachment-target member 10 is basically the same as in the above embodiment (see FIG. 24 and then FIG. 25). However, when the leg portion 2 is inserted into the insertion hole 11 and reaches to a predetermined depth, as shown in FIG. 26, the umbrella-shaped outer circumferential portion 4R of the head portion 4 comes into contact with the opening peripheral surface 12 of the attachment-target member 10, so that the opening peripheral surface 12 pushes up the outer circumferential portion 4R to the upper side. With this pushing, the outer circumferential portion 4R changes from the umbrella shape spreading outward toward the distal-end side of the leg portion 2 (see FIG. 25), to a reverse umbrella shape in which the outer circumferential side is bent by being pushed up (see FIG. 26). Thus, the insertion of the clip 1 into the insertion hole 11 is completed, whereby the attachment structure 100 for the clip 1 is formed. This completion can be easily recognized by the attachment worker through sound and a tactile sense due to bending of the outer circumferential portion 4R, visual recognition of the reverse umbrella shape (visual recognition of shape change), and the like.

A third modification of the above embodiment will be described with reference to FIGS. 27 to 33.

Figure 27:
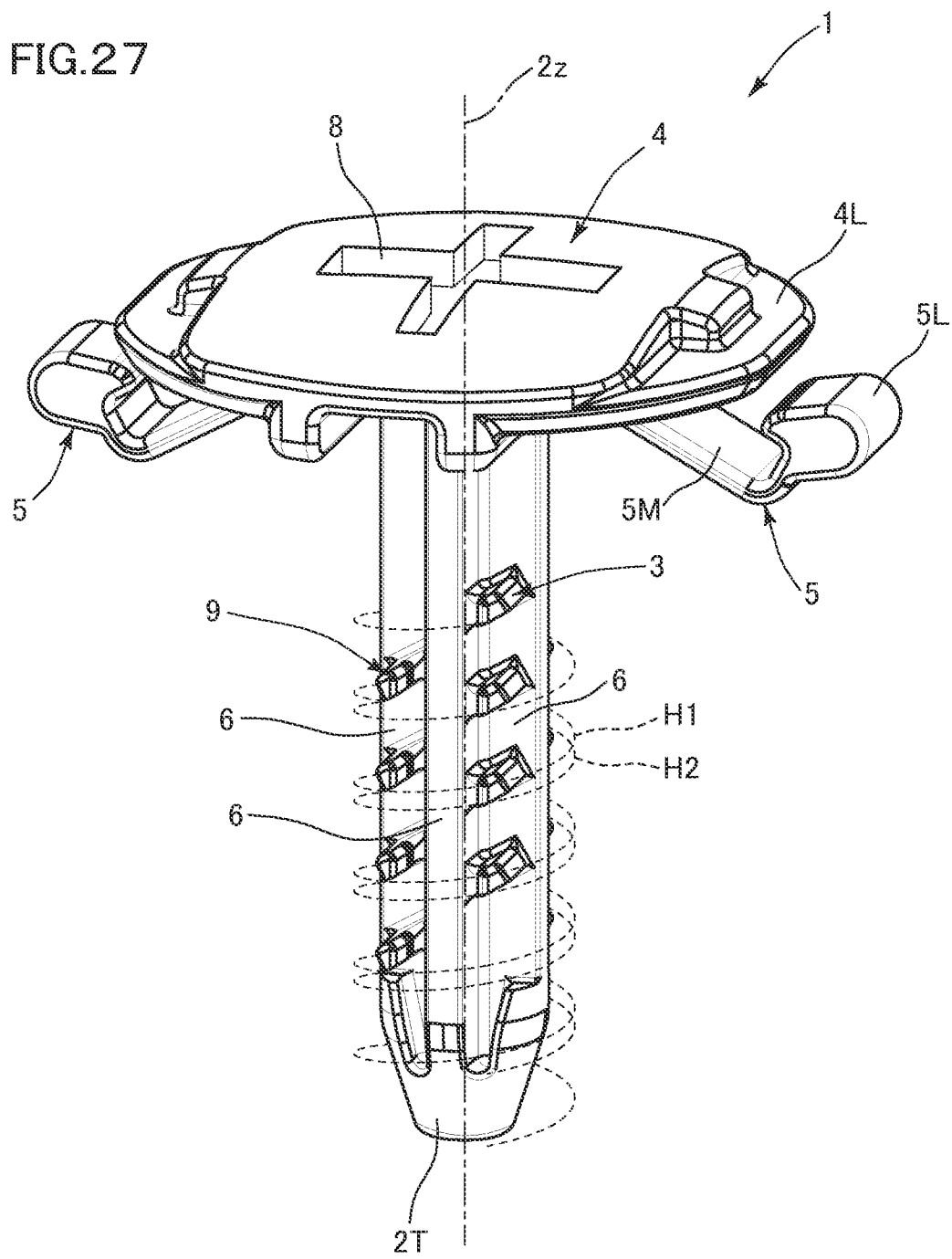
FIG. 27 is a perspective view of a clip used in a third modification.
Figure 28:
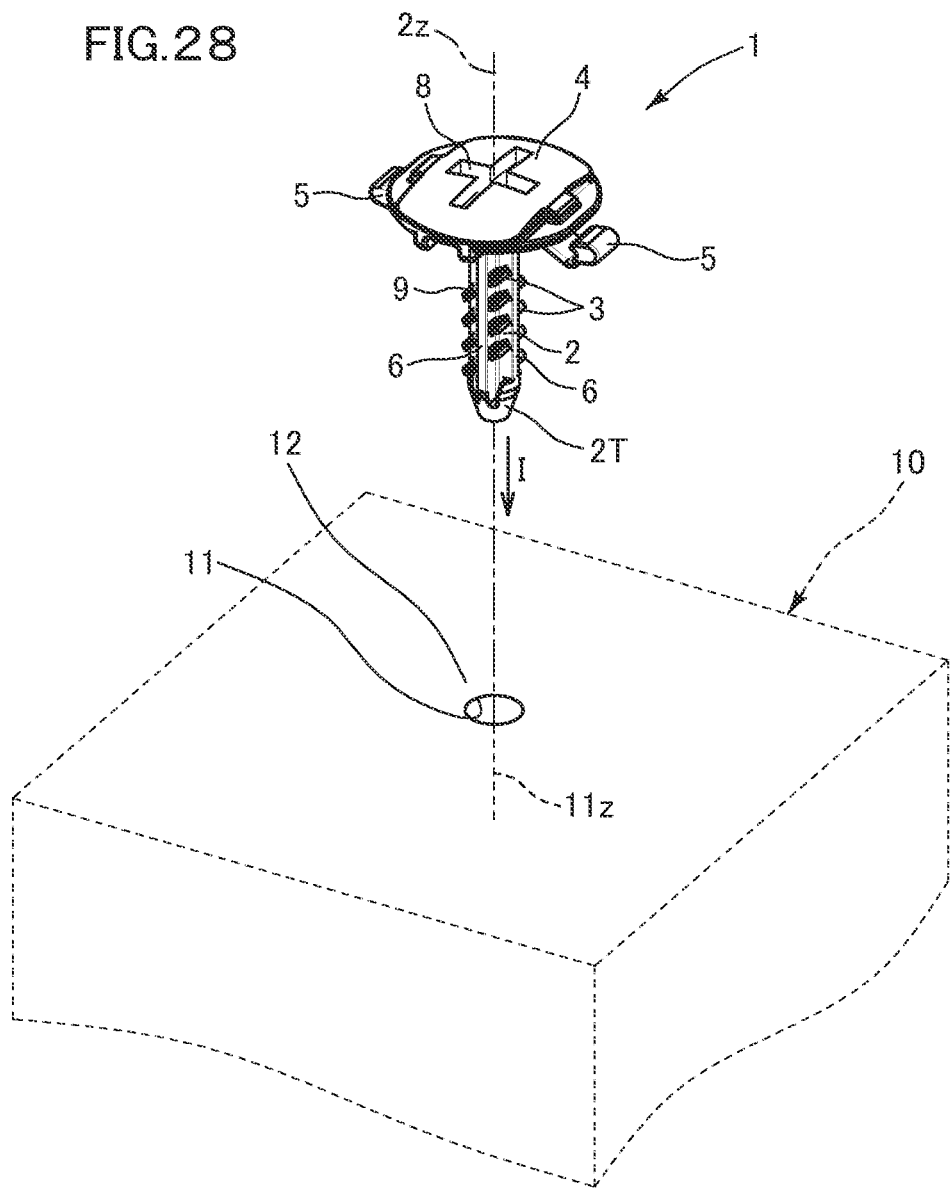
FIG. 28 is an exploded perspective view of a clip attachment structure in FIG. 27.

The clip 1 of the third modification has almost the same shape as in the above embodiment except that some of the engagement protrusions 3 are replaced with engagement protrusions 9 as shown in FIGS. 27 and 28. As with the engagement protrusions 3, a plurality of engagement protrusions 9 are formed so as to be arranged in the insertion direction I on the leg portion 2. Engagement corners 3d1, 3d3, 9d1, 9d3 of the respective engagement protrusions 3, 9 are formed so as to be distributed on a helix coaxial with the axis 2z of the leg portion 2. With the distributed arrangement on the helix, the clip 1 cannot be directly pulled out upward from the insertion hole 11 in a state in which the attachment structure 100 is formed, but can be pulled out like a screw by being rotated in a predetermined direction around the axis 2z.

The engagement corners 3d1, 3d3, 9d1, 9d3 of the respective engagement protrusions 3, 9 are formed so as to be distributed on one helix coaxial with the axis 2z or a plurality of helices arranged in parallel in the direction of the axis 2z (axial direction) coaxially therewith (here, two helices H1, H2 that do not overlap each other) (see FIG. 27). Therefore, for example, if the head portion 4 is provided with an engagement portion 8 (jig engagement portion; here, cross-shaped groove) for rotating the clip 1 toward the ascending-direction side of the helices by a predetermined jig (e.g., screwdriver), the clip can be easily detached from the insertion hole 11 by the jig. In addition, the clip 1 can be reused.

Figure 29:
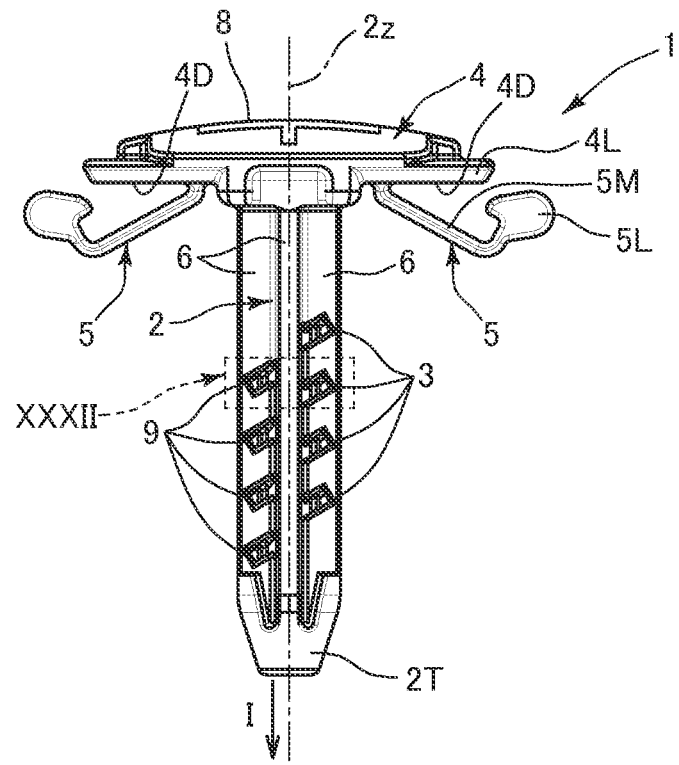
FIG. 29 is a front view of a clip in FIG. 27.
Figure 30:
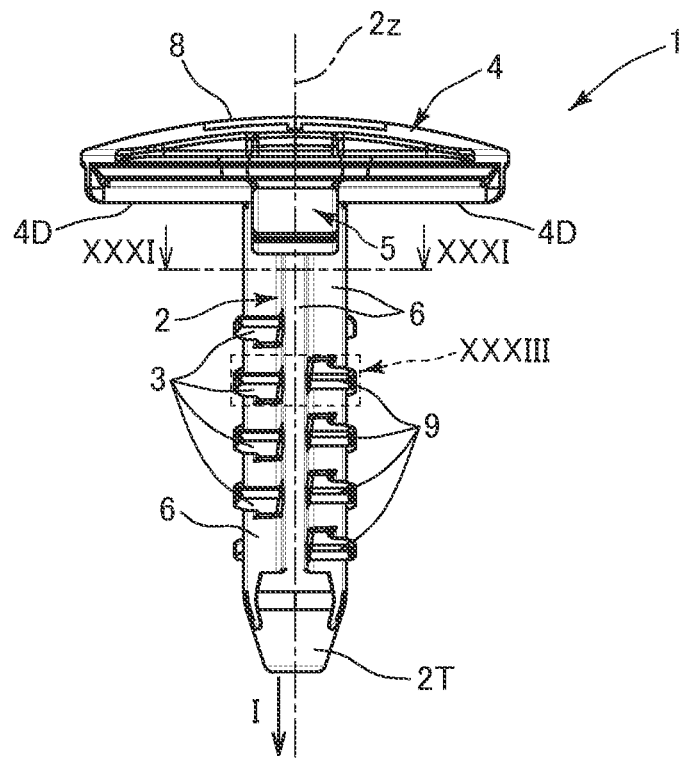
FIG. 30 is a side view of the clip in FIG. 27.
Figure 31:
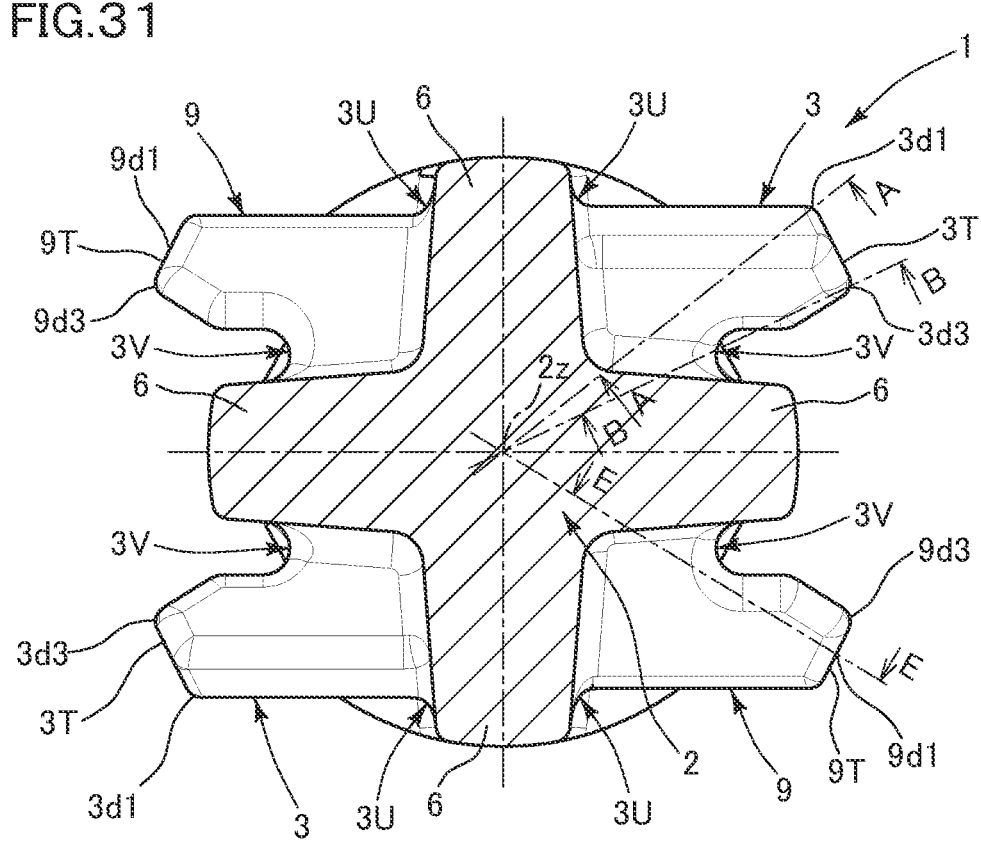
FIG. 31 is a sectional view along line XXXI-XXXI in FIG. 30.
Figure 32:
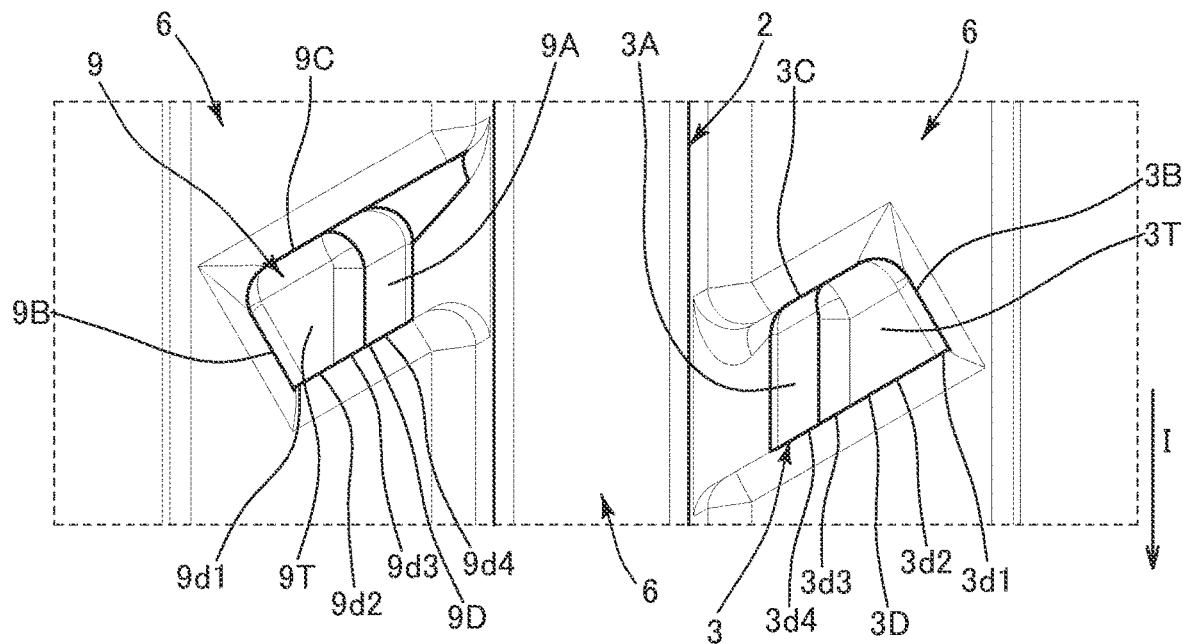
FIG. 32 is an enlarged view of part XXXII in FIG. 29.
Figure 33:
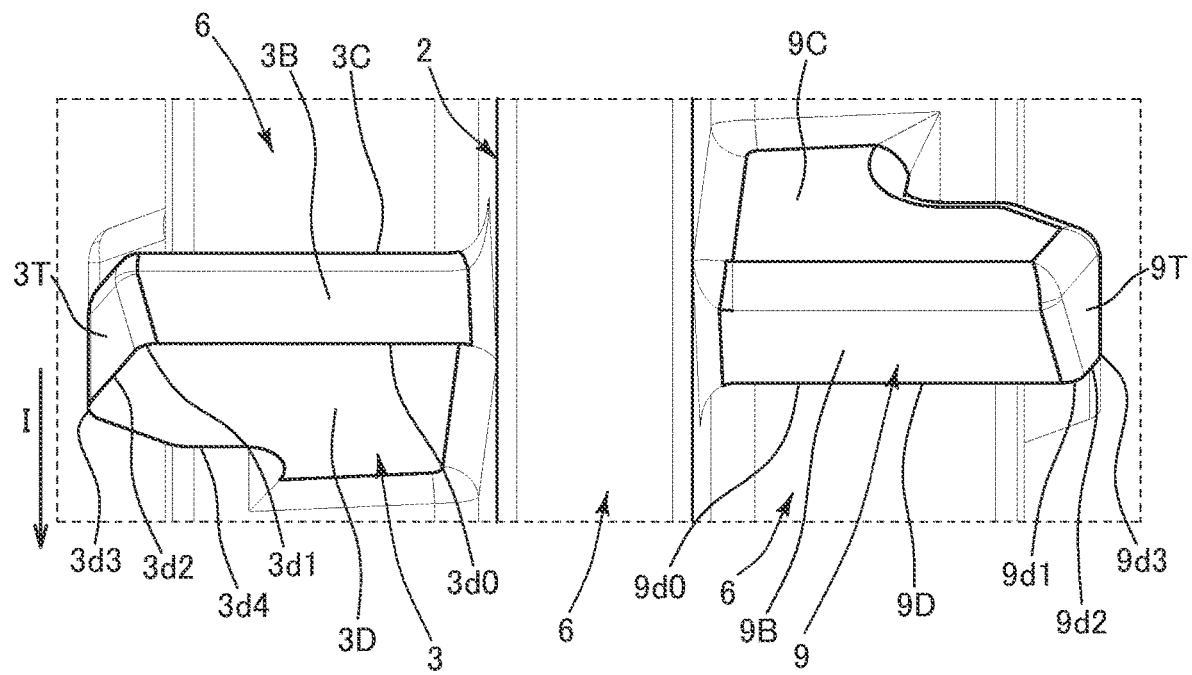
FIG. 33 is an enlarged view of part XXXIII in FIG. 30.

As shown in FIGS. 29 and 30, regarding the engagement protrusions 3, 9 of the third modification, the engagement protrusions 3 on one of the sides adjacent to each other across the reinforcement plate portion 6 are formed in a plate shape extending in an obliquely upward-and-outward direction from the outer circumferential surface of the leg portion 2 in the natural state (non-elastically-deformed state), and thus are formed in the same shape as in the above embodiment. Meanwhile, the engagement protrusions 9 on the other side are formed in a plate shape extending in an obliquely downward-and-outward direction from the outer circumferential surface of the leg portion 2 in the natural state. As in the above embodiment, the distal-end side of each engagement protrusion 3, 9 can be elastically deformed in the up-down direction with the leg portion 2 side as a fulcrum. The description of the engagement protrusions 3 is omitted because they have the same shape as in the above embodiment.

Figure 35:
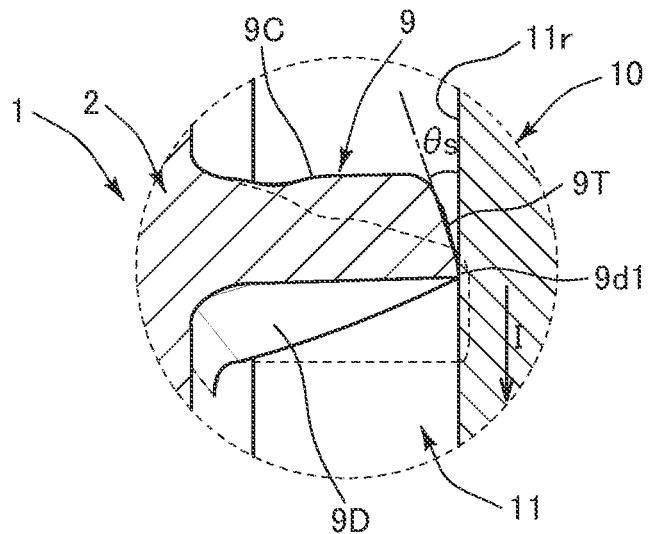
FIG. 35 is a view following FIG. 34.
Figure 36:
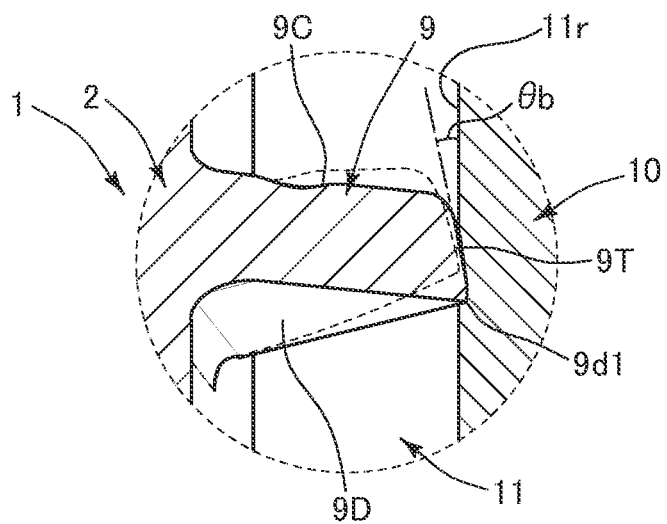
FIG. 36 is a view following FIG. 35.

The engagement protrusions 9 will be specifically described. In each engagement protrusion 9 extending in an obliquely downward-and-outward direction, outermost edge portions 9d1, 9d3 at the most distant positions from the axis 2z among outer edge portions 9d0 to 9d4 of a lower surface 9D are formed as sharpened corners (see FIGS. 31 to 33). Here, all the outer edge portions 9d0 to 9d4 are formed as sharpened corners. The sharpened corners 9d1, 9d3 forming the outermost edge portions serve as engagement corners to interfere and engage with the inner circumferential wall surface 11r at the time of inserting the clip 1 into the insertion hole 11 and after the insertion (see FIG. 34). At the time of insertion into the insertion hole 11, the engagement corners 9d1, 9d3 slide on the inner circumferential wall surface 11r (see FIG. 35) and each engagement protrusion 9 is elastically deformed such that the distal-end side (sharpened corner 9d1, 9d3 side) thereof is bent upward. Meanwhile, after the insertion, the engagement corners 9d1, 9d3 form an engaged state of digging into the inner circumferential wall surface 11r by elastic restoration of the engagement protrusion 9 (see FIG. 36).

In this third modification, the sharpened corner 9d1 is a first engagement corner, and the sharpened corner 9d3 is a second engagement corner. An upper surface 9C and the lower surface 9D are flat surfaces parallel to each other. Of side surfaces 9A, 9B, 9T, the side surface 9T is a distal-end surface of the engagement protrusion 9.

Figure 34:
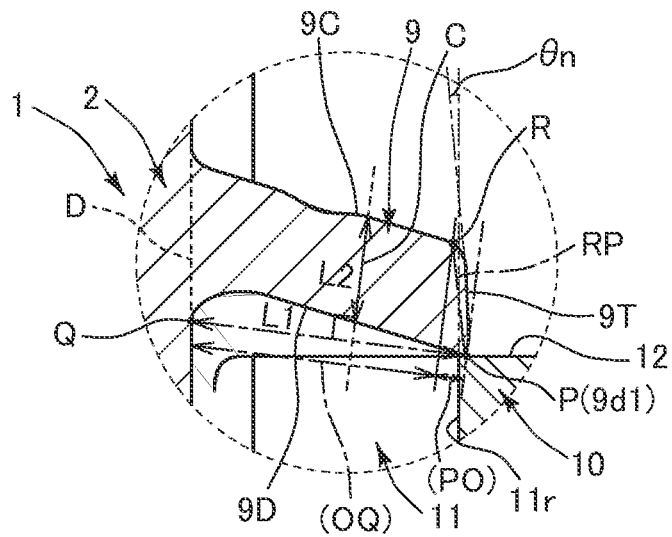
FIG. 34 is a sectional view along line E-E in FIG. 31, schematically showing the first engagement protrusion when the clip is being inserted into the insertion hole.

For the thicknesses of the engagement protrusions 3, 9, the same prescription as in the above embodiment is applied (see FIGS. 13 and 34). The engagement protrusion 9 is also formed with the thickness based on the same prescription (see FIG. 34) as in the engagement protrusion 3, and has such a shape that the distal-end surface 9T proximally opposes the inner circumferential wall surface 11r of the insertion hole 11 at the time of inserting the leg portion 2 into the insertion hole 11 (see FIG. 35) and after the insertion (see FIG. 36). Here, in the natural state (non-elastically-deformed state) (see FIG. 34), the distal-end surface 9T is inclined such that an angle θn in the radial direction between the distal-end surface 9T and the direction of the axis 2z (inner circumferential wall surface 11r) is not less than 0 degrees and not greater than 30 degrees.

Figure 37:
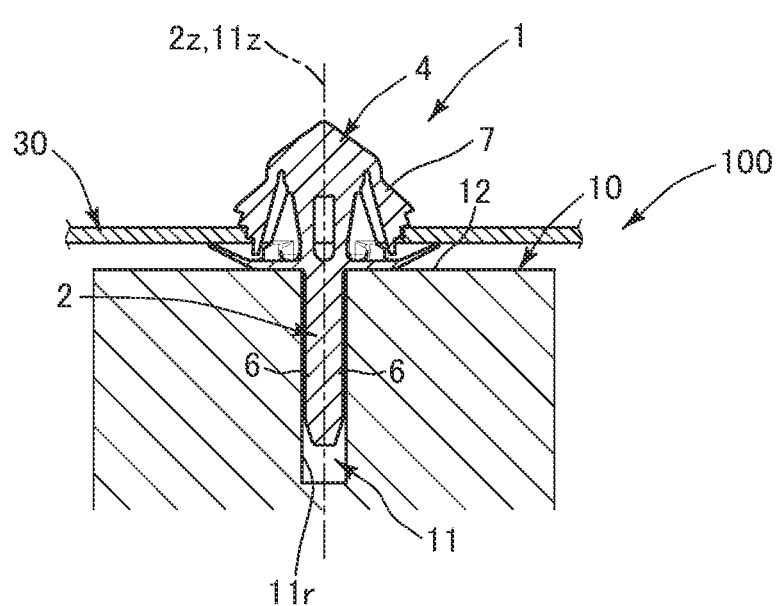
FIG. 37 is a sectional view of a clip attachment structure according to a fourth modification.

A fourth modification of the above embodiment will be described with reference to FIG. 37.

In the fourth modification, the head portion 4 of the clip 1 is provided with an assembly portion 7 to be assembled with another member 30 different from the attachment-target member 10. Then, the attachment structure 100 for the clip 1 is formed in a state in which the other member 30 is assembled with the assembly portion 7.

Figure 38:
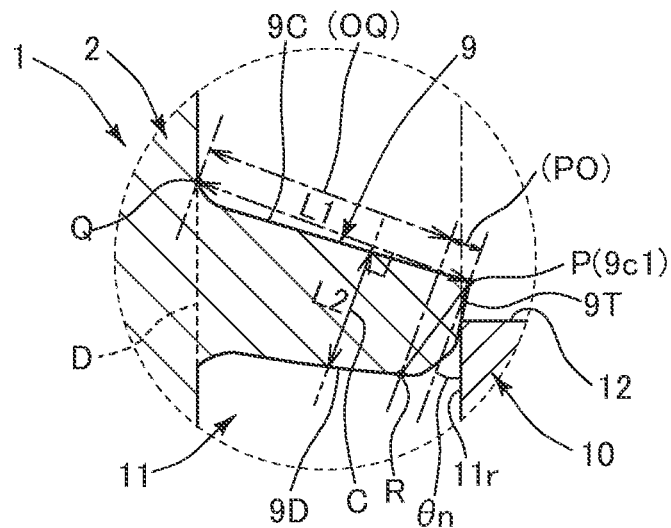
FIG. 38 is a sectional view schematically showing an engagement protrusion when a clip in a fifth modification is being inserted into an insertion hole.
Figure 39:
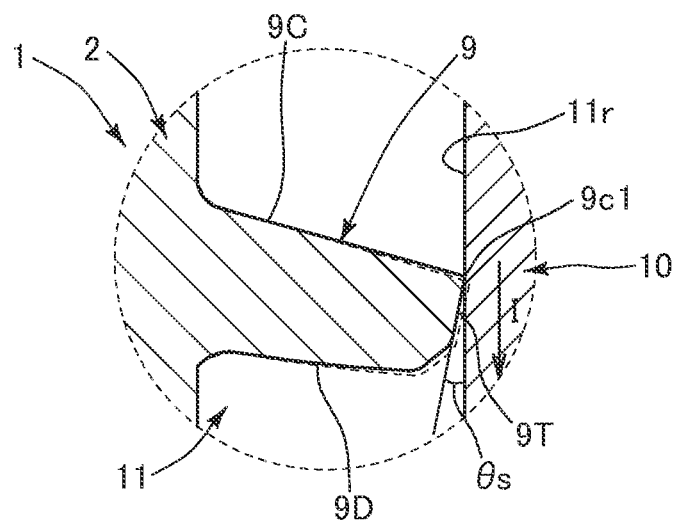
FIG. 39 is a view following FIG. 38.
Figure 40:
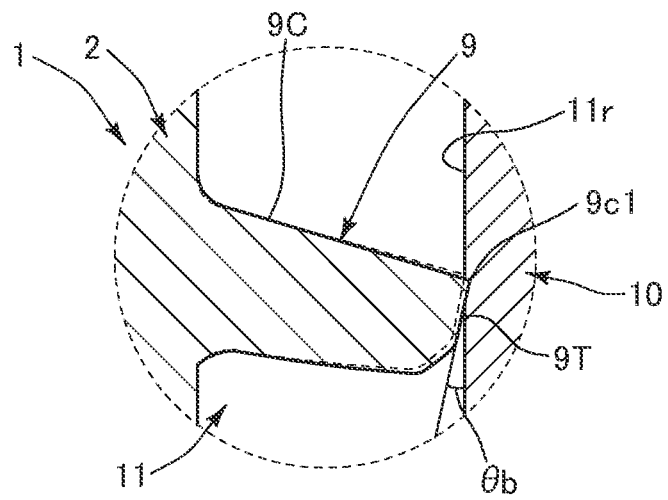
FIG. 40 is a view following FIG. 39.

A fifth modification of the above embodiment will be described with reference to FIGS. 38 to 40.

In the fifth modification, an outermost edge portion 9c1 is present at the most distant position from the axis 2z of the leg portion 2, in an outer edge portion of the upper surface 9C of the engagement protrusion 9 extending obliquely downward from the leg portion 2. The outermost edge portion 9c1 is formed as a sharpened corner, and serves as an engagement corner. Thus, at the time of insertion into the insertion hole 11, the engagement corner 9c1 slides on the inner circumferential wall surface 11r (see FIG. 39) and the engagement protrusion 9 is elastically deformed such that the distal-end side (sharpened corners 9d1, 9d3 side) thereof is bent upward. Meanwhile, after the insertion, the engagement corner 9c1 forms an engaged state of digging into the inner circumferential wall surface 11r by elastic restoration of the engagement protrusion 9 (see FIG. 40). The cross-sections shown in FIGS. 38 to 40 are similar to the cross-section in FIG. 13, and are cross-sections cut so as to include the axis 2z of the leg portion 2 and the engagement corner 9c1 in the engagement protrusion 9. The engagement protrusions 9 in the fifth modification may be replaced with the engagement protrusions 3 extending obliquely upward from the leg portion 2.

The plate thickness L2 of the engagement protrusions 3 applicable in this invention may be prescribed by another method.

Figure 41:
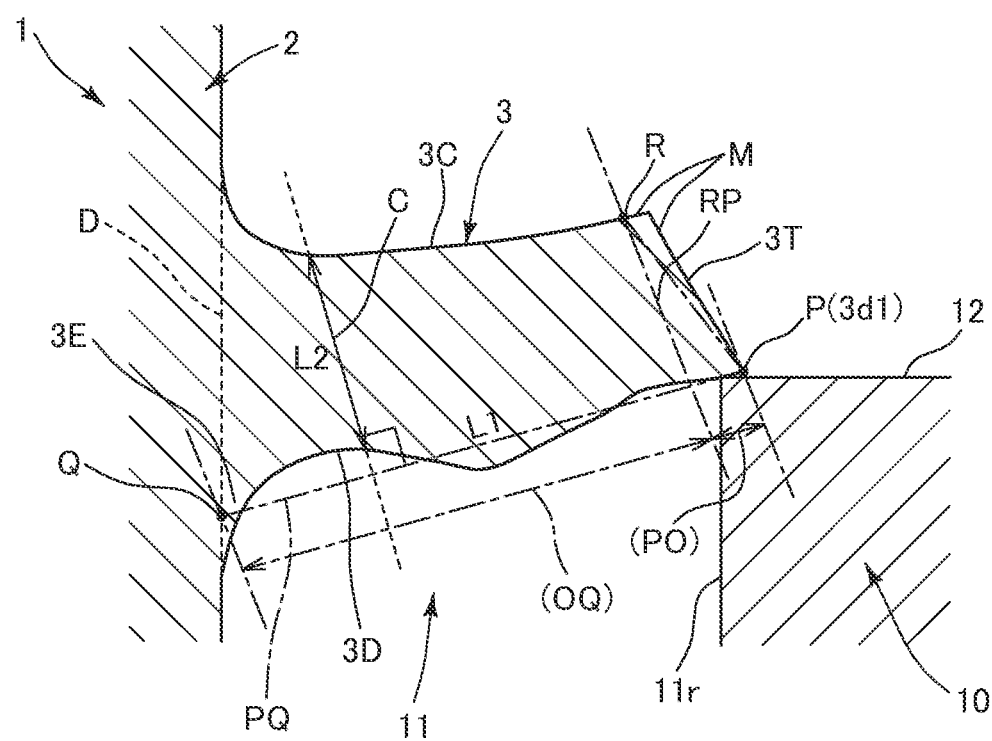
FIG. 41 is a sectional view along line A-A in FIG. 4, schematically showing another method for prescribing the plate thickness of the engagement protrusion.

For example, P and Q used in the prescription in the above embodiment may be set by a method different from the above method. The cross-section of the engagement protrusion 3 in FIG. 41 is a cross-section obtained by cutting the engagement protrusion 3 in the same manner as in FIG. 13. In this cross-section, the engagement corner 3d1 is set as a vertex P, an approximate straight line is set so as to pass the engagement corner 3d1 along a ridge line extending from the vertex P to the base-end side (leg portion 2 side) of the engagement protrusion 3, and then the intersection of the approximate straight line and a cut plane D obtained by cutting the engagement protrusion 3 from the leg portion 2 can be set as a connection point Q between the engagement protrusion 3 and the leg portion 2. Such prescription is effective for a case where the lower surface 3D or the upper surface 3C of the engagement protrusion 3 is not flat, a case of having a large thickened portion 3E provided at an upper/lower part on the base-end side of the engagement protrusion 3 so as to smoothly connect the engagement protrusion 3 and the leg portion 2, or the like.

Alternatively, the plate thickness L2 of the engagement protrusion 3 may be prescribed as follows. That is, in the natural state (non-elastically-deformed state), regarding at least one (here, 3d1) of the engagement corners 3d1, 3d3, the plate thickness L2 of the engagement protrusion 3 may be prescribed such that, in the cross-section in FIG. 13 or FIG. 41 including the engagement corner 3d1 and the axis 2z of the leg portion 2, the length L2 of the cut line C in the 80% region (OQ) on the leg portion 2 side excluding the 20% region (PO) on the distal-end side in the region of the straight line PQ satisfies L1×⅓≤L2 irrespective of the cut position, and in the 20% region (PO) on the distal-end side, the outer edge line M formed by end points of the cut line C on the side opposite to the straight line PQ passes a position coinciding with the straight line RP extending from the end R on the leg portion 2 side of the outer edge line M to the vertex P of the engagement corner 3d1, or a position outward thereof.

The plate thickness of the engagement protrusions in this invention may satisfy at least one of all the prescriptions described above.

DESCRIPTION OF THE REFERENCE CHARACTERS 100 clip attachment structure
1 clip
2 leg portion
3, 9 engagement protrusion
3d0 to 3d4, 9d0 to 9d4, 9c1 outer edge portion (sharpened corner)
3d1, 3d3, 9d1, 9d3, 9c1 engagement corner
4 head portion
4R outer circumferential portion (insertion completion notification means)
5 elastic latch piece (insertion completion notification means)
10 attachment-target member
11 insertion hole
20 intervening member
21 through hole
L1 length of engagement protrusion
L2 plate thickness of engagement protrusion
I insertion direction

What is claimed is:

1. A clip attachment structure in which a clip having a bead portion and a columnar leg portion protruding downward therefrom is attached such that the leg portion is inserted into a cylindrical insertion hole of a vehicular attachment-target member, which is an injection-molded product of resin, wherein
the clip which is an injection-molded product of resin, has a plurality of plate-shaped engagement protrusions arranged in an insertion direction side into the insertion hole, the plate-shaped engagement protrusions extending outward from an outer circumferential surface of the leg portion in a non-elastically-deformed state,
the engagement protrusions have sharpened corners at outermost edge portions corresponding to most distant positions from an axis of the leg portion on upper surfaces or lower surfaces thereof, the sharpened corners being sharpened to have a corner radius less than 0.2 mm, and
the sharpened corners include engagement corners configured to, at a time of insertion into the insertion hole, slide on an inner circumferential wall surface of the insertion hole while the engagement protrusions are elastically deformed, and after the insertion, form an engaged state of digging into the inner circumferential wall surface by elastic restoration of the engagement protrusions within the insertion hole, thus preventing the clip from coming off from the insertion hole, and
when the engaging protrusions are in the non-elastically-deformed state, the engagement corners are arranged so as to be slightly outside a periphery of the insertion hole, so that the engagement corners are configured to interfere and engage with the inner circumferential wall surface of the insertion hole with slight interference, and
when the clip is attached to the insertion hole, all of the engagement protrusions are configured to be located in the insertion hole, and all of the engagement corners are configured to form an engaged state of digging into the inner circumferential wall surface within the insertion bole by elastic restoration of the engaging protrusions within the insertion hole, and
each engagement protrusion has the upper surface, the lower surface, and a side surface connecting them,
the engagement corners are lower edges of corner surfaces on both sides in the circumferential direction about the axis of a distal-end surface, which is a part of the side surface and is located at most distant position from the axis of the leg portion in each engagement protrusion,
the clip has a plurality of reinforcement plate portions,
all of the reinforcement plate portions have plate shapes extending in a length direction of the leg portion and protruding outward so that distances to distal-end surfaces located at most distant positions from the axis at a plurality of positions in the circumferential surface of the leg portion are approximately the same, and are provided integrally with the leg portion,
each engagement protrusion is formed over an area between the reinforcement plate portions adjacent to each other in the circumferential direction so that each distance from the axis to each engagement corner is greater than each distance from the axis to the distal-end surface of each reinforcement plate, and when the clip is attached to the insertion hole, all of the engagement corners are configured to be allowed to form an engaged state of digging into the inner circumferential wall surface within the insertion hole by elastic restoration of the engaging protrusions within the insertion hole, and each engagement protrusion has a cutout formed therein that does not appear in a cross-section including a first engagement corner, which is one of the engagement corners at the both sides, and the axis of the leg portion, but appears to penetrate the engagement protrusion from top to bottom in a cross-section including a second engagement corner, which is the other of the engagement corners at the both sides, and the axis of the leg portion, each cutout is formed by removing an outer side of each engagement protrusion on a side facing the reinforcement plate portion so that a connection area between the engagement protrusion and the reinforcement plate portion adjacent to the second engaging corner portion is reduced, and in each engagement protrusion, an angle between the distal-end surface and the lower surface is less than 90° when viewed in the cross-section including the first engagement corner and the axis of the leg portion.

2. The clip attachment structure according to claim 1, wherein when the engagement protrusions are in the non-elastically-deformed state, in the cross-section including the first engagement corner and the axis of the leg portion, a length of a straight line PQ from a vertex P of the one engagement corner to a connection point Q between the engagement protrusion and the leg portion is defined as the length L1 of the engagement protrusion, and a plate thickness of the engagement protrusion in a direction perpendicular to the straight line PQ is defined as the plate thickness L2 of the engagement protrusion, in an 80% region of the straight line PQ on the leg portion side excluding a 20% region of the straight line PQ on a distal-end side opposite to the leg portion, the plate thickness L2 of the engagement protrusion satisfies $L1 \times 1/3 \leq L2$.

3. The clip attachment structure according to claim 1, wherein the engagement corners are arranged so as to be distributed on a predetermined helix coaxial with the axis of the leg portion, thus serving as thread crests, so that the clip in the engaged state is allowed to be pulled out from the insertion hole by being rotated in a predetermined direction around the axis.

4. The clip attachment structure according to claim 1, wherein the clip, comprising insertion completion notification means configured to cause one or more of sound and a tactile sense when the leg portion is inserted to a predetermined depth in the insertion hole.

5. The clip attachment structure according to claim 1, wherein the clip is attached to the attachment-target member such that the leg portion is inserted into the insertion hole at a stage after penetrating through a through hole of an intervening member separate from the attachment-target member.

6. The clip attachment structure according to claim 1, wherein the first engagement corner and the second engagement corner are arranged at different height positions in the insertion direction.

7. The clip attachment structure according to claim 1, wherein an angle between the distal-end surface and the inner circumferential wall surface substantially parallel to the axis is not less than 0 degrees and not greater than 30 degrees, when the engagement protrusion is in the non-elastically-deformed state.

8. The clip attachment structure according to claim 1, wherein the reinforcement plate portions have plate shapes extending in the insertion direction and protruding outward from a plurality of positions in the circumferential direction on the outer circumferential surface of the leg portion so as to have a substantially+shape when viewed from a distal-end side of the leg portion.

* * * * *